United States Patent
Gan et al.

(10) Patent No.: US 11,864,039 B2
(45) Date of Patent: *Jan. 2, 2024

(54) INDIVIDUALLY ADDRESSED TRAFFIC INDICATION METHOD APPLICABLE TO MULTIPLE LINKS AND RELATED APPARATUS

(71) Applicant: HUAWEI TECHNOLOGIES CO., LTD., Guangdong (CN)

(72) Inventors: Ming Gan, Shenzhen (CN); Yiqing Li, Shenzhen (CN); Chenchen Liu, Shenzhen (CN); Jian Yu, Shenzhen (CN); Mengshi Hu, Shenzhen (CN); Yunbo Li, Shenzhen (CN); Yuchen Guo, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/148,303

(22) Filed: Dec. 29, 2022

(65) Prior Publication Data

US 2023/0145827 A1    May 11, 2023

Related U.S. Application Data

(63) Continuation of application No. PCT/CN2021/111335, filed on Aug. 6, 2021.

(30) Foreign Application Priority Data

Aug. 7, 2020    (CN) .......................... 202010791117.1

(51) Int. Cl.
*H04W 8/26* (2009.01)
*H04W 36/00* (2009.01)
*H04W 74/00* (2009.01)

(52) U.S. Cl.
CPC ..... *H04W 36/0077* (2013.01); *H04W 74/006* (2013.01)

(58) Field of Classification Search
CPC .......................... H04W 36/0077; H04W 74/006
See application file for complete search history.

(56) References Cited

U.S. PATENT DOCUMENTS

| 9,743,275 B2 | 8/2017 | Asterjadhi et al. |
| 2013/0230035 A1 | 9/2013 | Grandhi et al. |

(Continued)

FOREIGN PATENT DOCUMENTS

| CN | 103313201 A | 9/2013 |
| CN | 108541047 A | 9/2018 |

(Continued)

OTHER PUBLICATIONS

Patil et al., "MLO: Efficient Paging," IEEE 802.11-19/1955r2, May 26, 2020, 17 pages.

(Continued)

*Primary Examiner* — Michael J Moore, Jr.
*Assistant Examiner* — Prenell P Jones
(74) *Attorney, Agent, or Firm* — Fish & Richardson P.C.

(57) ABSTRACT

This application relates to the field of wireless communication, and in particular, to individually addressed traffic indication methods and apparatuses applicable to multiple links, for example, in a wireless local area network supporting an 802.11be standard. In an example method, a first access point (AP) of a first access point multi-link device (AP MLD) generates and sends individually addressed traffic indication information. The individually addressed traffic indication information is used to indicate whether a non-AP MLD associated with the first AP MLD has a downlink individually addressed traffic and whether a non-AP MLD associated with a second AP MLD has a downlink individu- (Continued)

ally addressed traffic. The second AP MLD is an AP MLD to which a non-transmitted AP belongs. The non-transmitted AP is in a multiple basic service set identifier (BSSID) set in which the first AP is located.

20 Claims, 15 Drawing Sheets

(56) References Cited

U.S. PATENT DOCUMENTS

| | | | | |
|---|---|---|---|---|
| 2018/0302923 | A1* | 10/2018 | Patil | H04W 74/008 |
| 2019/0021025 | A1 | 1/2019 | Ahn et al. | |
| 2019/0200171 | A1 | 6/2019 | Huang et al. | |
| 2019/0215884 | A1* | 7/2019 | Patil | H04W 52/0219 |
| 2019/0268825 | A1 | 8/2019 | Patil et al. | |
| 2020/0112910 | A1* | 4/2020 | Cherian | H04W 72/0446 |
| 2020/0154443 | A1* | 5/2020 | Patil | H04W 72/30 |
| 2020/0221545 | A1 | 7/2020 | Stacey et al. | |
| 2021/0144787 | A1* | 5/2021 | Kwon | H04W 8/26 |
| 2021/0212141 | A1* | 7/2021 | Chu | H04W 48/12 |
| 2021/0298102 | A1* | 9/2021 | Kwon | H04W 48/08 |
| 2022/0287122 | A1* | 9/2022 | Wang | H04W 8/22 |
| 2023/0007535 | A1* | 1/2023 | Kim | H04W 76/20 |
| 2023/0071851 | A1* | 3/2023 | Gan | H04W 72/121 |
| 2023/0110142 | A1* | 4/2023 | Gan | H04W 4/20 |
| | | | | 370/312 |

FOREIGN PATENT DOCUMENTS

| | | |
|---|---|---|
| EP | 2966907 A1 | 1/2016 |
| RU | 2590888 C2 | 7/2016 |
| WO | 2013135110 A1 | 9/2013 |
| WO | 2018157786 A1 | 9/2018 |
| WO | 2019139789 A1 | 7/2019 |

OTHER PUBLICATIONS

Kwon et al., "Multi-Link TIM," IEEE 802.11-20/0066r3, Jan. 2020, 16 pages.

Park et al., "Multi-link TIM—follow up," IEEE 802.11-20/0084r1, Apr. 10, 2020, 9 pages.

IEEE P802.11ax/D6.0, "Draft Standard for Information technology—Tele-communications and information exchange between systems Local and metropolitan area networks—Specific requirements, Part 11: Wireless LAN Medium Access Control (MAC) and Physical Layer (PHY) Specifications," Nov. 2019, 780 pages.

IEEE Std 802.11-2016, "IEEE Standard for Information technology—Telecommunications and information exchange between systems Local and metropolitan area networks—Specific requirements, Part 11: Wireless LAN Medium Access Control (MAC) and Physical Layer (PHY) Specifications," Dec. 7, 2016, 3534 pages.

International Search Report and Written Opinion in International Appln. No. PCT/CN2021/111335, dated Nov. 4, 2021, 17 pages (with English translation).

Wentink, "STA and AP," IEEE 802.11-19/106r0, Jan. 12, 2019, 4 pages.

Office Action in Russian Appln. No. 2023105085, dated Sep. 6, 2023, 22 pages (with English translation).

* cited by examiner

AP MLD: access point multi-link device;
Non-AP MLD: non-access-point multi-link device;
MAC: media access control;
PHY: physical layer.

| Element ID | Length | Max BSSID indicator | Optional subelement |
|---|---|---|---|
| 1 byte | 1 byte | 6 bytes | Variable |

Element ID: element identifier;
BSSID: basic service set identifier.

| Element identifier Element ID | Length Length | Association identifier AID |
|---|---|---|
| 1 | 1 | 2 |

Bytes

INDIVIDUALLY ADDRESSED TRAFFIC INDICATION METHOD APPLICABLE TO MULTIPLE LINKS AND RELATED APPARATUS

CROSS-REFERENCE TO RELATED APPLICATIONS

This application is a continuation of International Application No. PCT/CN2021/111335, filed on Aug. 6, 2021, which claims priority to Chinese Patent Application No. 202010791117.1, filed on Aug. 7, 2020. The disclosures of the aforementioned applications are hereby incorporated by reference in their entireties.

TECHNICAL FIELD

This application relates to the field of wireless communications technologies, and in particular, to an individually addressed traffic indication method applicable to multiple links and a related apparatus.

BACKGROUND

To significantly increase a service transmission rate of a wireless local area network (wireless local area network, WLAN) system, in an Institute of Electrical and Electronics Engineers (IEEE, Institute of Electrical and Electronics Engineers) 802.11ax standard, an orthogonal frequency division multiple access (OFDMA, Orthogonal Frequency Division Multiple Access) technology is further used based on an existing orthogonal frequency division multiplexing (OFDM, Orthogonal Frequency Division Multiplexing) technology. The OFDMA technology supports multiple nodes in sending and receiving data simultaneously. This achieves multi-station diversity gains.

A next-generation Wi-Fi standard, IEEE 802.11be, is referred to as an extremely high throughput (extremely high throughput, EHT) or Wi-Fi 7, and has a most important technical goal that is to significantly increase a peak throughput. WLAN devices supporting an IEEE 802.11be standard can increase a peak throughput and reduce a delay of traffic transmission through multiple streams (a maximum spatial stream count is 16), through multiple frequency bands (for example, frequency bands of 2.4 GHz, 5 GHz, and 6 GHz), and through cooperation among multiple channels on the same frequency band. The multiple frequency bands or multiple channels may be collectively referred to as multiple links. A next-generation IEEE 802.11 standard station device that supports multiple links at the same time is referred to as a multi-link device (multi-link device, MLD).

However, some special access point multi-link devices (for example, all access points (access point, AP) included in the access point multi-link devices are APs whose basic service set identifiers (Basic Service Set identifier, BSSID) are non-transmitted (Non-transmitted) BSSIDs) cannot send beacon frames to indicate whether station (station, STA) multi-link devices associated with the access point multi-link devices have downlink individually addressed traffics. Consequently, the station multi-link devices associated with the access point multi-link devices cannot correctly receive downlink individually addressed traffics. In this way, for the some special access point multi-link devices (AP MLD), how to perform downlink individually addressed traffic indication has become an urgent problem to be resolved.

SUMMARY

Embodiments of this application provide an individually addressed traffic indication method applicable to multiple links and a related apparatus. This can help some APs or all APs of some AP MLDs indicate whether station multi-link devices associated with the AP MLDs have downlink individually addressed traffics, to assist the station multi-link devices in correctly receiving downlink individually addressed traffics.

The following describes this application from different aspects. It should be understood that mutual reference may be made to the following implementations and beneficial effects of the different aspects.

According to a first aspect, this application provides an individually addressed traffic indication method applicable to multiple links. The method is applied to a first AP MLD, and a first AP is a reporting AP. The individually addressed traffic indication method applicable to multiple links includes: the first AP of the first AP MLD generates individually addressed traffic indication information, and sends the individually addressed traffic indication information on a first link. The individually addressed traffic indication information is used to indicate whether a non-AP MLD associated with the first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which the first AP is located belongs. The first link is a working link of the first AP.

Optionally, the reporting AP may be an AP that sends a management frame, where the management frame carries information about multiple APs in a collocated AP MLD set of the reporting AP. The management frame is, for example, a beacon frame or a probe response frame.

The individually addressed traffic indication information in this solution not only can indicate whether the non-AP MLD associated with the first AP MLD has a downlink individually addressed traffic, but also can help the second AP MLD indicate whether the non-AP MLD associated with the second AP MLD has a downlink individually addressed traffic, and the second AP MLD is an AP MLD to which a non-transmitted AP in the multiple BSSID set in which the first AP is located belongs. This can resolve a problem that some APs or all APs of AP MLDs cannot indicate whether non-AP MLDs associated with the AP MLDs have downlink individually addressed traffics, so that the non-AP MLDs associated with the APs can normally receive downlink individually addressed traffics.

In addition, because there is a possibility that all APs of an AP MLD in 802.11be are non-transmitted APs, this solution can resolve a problem that AP MLDs whose APs are all non-transmitted APs cannot send individually addressed traffic indications, thereby improving integrity and diversity of downlink individually addressed traffic indications.

With reference to the first aspect, in a possible implementation, the method further includes: the first AP of the first AP MLD generates and sends association identifier (association identifier) AID allocation information, where the AID allocation information carries an AID allocated to the non-AP MLD, and the AID is different from an AID of the non-AP MLD associated with the second AP MLD.

Optionally, the AID allocation information is carried in an association response frame. It may be understood that the AID allocation information may be alternatively carried in other frames.

Optionally, before a first AP of the first AP MLD sends an association response frame, the method further includes: the first AP of the first AP MLD receives an association request frame, where the association request frame is used to request to establish a multi-link association with the first AP MLD.

In this solution, when an AID is allocated, it is considered that the first AP MLD helps the second AP MLD indicate whether the non-AP MLD associated with the second AP MLD has a downlink individually addressed traffic, so that an AID allocated by the first AP MLD to the non-AP MLD associated with the first AP MLD is different from the AID of the non-AP MLD associated with the second AP MLD, so that an AID ambiguity can be avoided when the downlink individually addressed traffic is indicated.

According to a second aspect, this application provides an individually addressed traffic indication method applicable to multiple links. The method is applied to a non-AP MLD. The individually addressed traffic indication method applicable to multiple links includes: a first STA of the non-AP MLD receives individually addressed traffic indication information on a first link on which the first STA works, and determines, according to the received individually addressed traffic indication information, whether the non-AP MLD has a downlink individually addressed traffic. The individually addressed traffic indication information is used to indicate whether a non-AP MLD associated with a first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which the first AP is located belongs.

Optionally, the reporting AP may be an AP that sends a management frame, where the management frame carries information about multiple APs in a collocated AP MLD set of the reporting AP. The management frame is, for example, a beacon frame or a probe response frame.

With reference to the second aspect, in a possible implementation, the method further includes: The first STA of the non-AP MLD receives AID allocation information; and parses the received AID allocation information, to learn that the AID allocation information carries an AID allocated to the non-AP MLD, where the AID is different from an AID of the non-AP MLD associated with the second AP MLD.

Optionally, the AID allocation information is carried in an association response frame. It may be understood that the AID allocation information may be alternatively carried in other frames.

Optionally, before the first STA of the non-AP MLD receives an association response frame, the method further includes: the first STA of the non-AP MLD generates and sends an association request frame, where the association request frame is used to request to establish a multi-link association with the first AP MLD.

According to a third aspect, this application provides a communications apparatus. The communications apparatus may be a first AP MLD or a chip in the first AP MLD, such as a Wi-Fi chip, or may be a first AP of the first AP MLD, and includes: a processing unit, configured to generate individually addressed traffic indication information, where the individually addressed traffic indication information is used to indicate whether a non-AP MLD associated with the first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which a first AP is located belongs; and a transceiver unit, configured to send the individually addressed traffic indication information on a first link, where the first link is a working link of the first AP.

Optionally, the reporting AP may be an AP that sends a management frame, where the management frame carries information about multiple APs in a collocated AP MLD set of the reporting AP. The management frame is, for example, a beacon frame or a probe response frame.

With reference to the third aspect, in a possible implementation, the processing unit is further configured to generate AID allocation information, where the AID allocation information carries the AID allocated to the non-AP MLD, and the AID is different from the AID of the non-AP MLD associated with the second AP MLD; and the transceiver unit is further configured to send the AID allocation information.

Optionally, the AID allocation information is carried in an association response frame. It may be understood that the AID allocation information may be alternatively carried in other frames.

Optionally, the transceiver unit is further configured to receive an association request frame, where the association request frame is used to request to establish a multi-link association with the first AP MLD.

According to a fourth aspect, this application provides a communications apparatus. The communications apparatus may be a non-AP MLD or a chip in the non-AP MLD, such as a Wi-Fi chip, or may be a first STA of the non-AP MLD, and includes: a transceiver unit, configured to receive individually addressed traffic indication information on a first link on which the first STA works, where the individually addressed traffic indication information is used to indicate whether a non-AP MLD associated with a first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which a first AP is located belongs; and a processing unit, configured to determine, according to the received individually addressed traffic indication information, whether the non-AP MLD has a downlink individually addressed traffic.

Optionally, the reporting AP may be an AP that sends a management frame, where the management frame carries information about multiple APs in a collocated AP MLD set of the reporting AP. The management frame is, for example, a beacon frame or a probe response frame.

With reference to the fourth aspect, in a possible implementation, the transceiver unit is further configured to receive AID allocation information; and the processing unit is further configured to parse the received AID allocation information, to learn that the AID allocation information carries an AID allocated to the non-AP MLD, where the AID is different from an AID of the non-AP MLD associated with the second AP MLD.

Optionally, the AID allocation information is carried in an association response frame. It may be understood that the AID allocation information may be alternatively carried in other frames.

Optionally, the processing unit is further configured to generate an association request frame; and the transceiver unit is further configured to send the association request frame, where the association request frame is used to request to establish a multi-link association with the first AP MLD.

In an implementation of any of the foregoing aspects, one bit of the individually addressed traffic indication information corresponds to one non-AP MLD, and a bit of the individually addressed traffic indication information is used to indicate whether a corresponding non-AP MLD has a downlink individually addressed traffic. The non-AP MLD herein includes the non-AP MLD associated with the first AP MLD and the non-AP MLD associated with the second AP MLD.

In an implementation of any of the foregoing aspects, one bit of the individually addressed traffic indication information corresponds to one association identifier AID, and a bit of the individually addressed traffic indication information is used to indicate whether a non-AP MLD identified by a corresponding AID has a downlink individually addressed traffic. The non-AP MLD herein includes the non-AP MLD associated with the first AP MLD and the non-AP MLD associated with the second AP MLD.

Optionally, the individually addressed traffic indication information is carried in a partial virtual bitmap field of a traffic indication map (traffic indication map) TIM element.

In this solution, some bits of the partial virtual bitmap field of the TIM element are used to indicate whether a non-AP MLD associated with an MLD in which the reporting AP is located has a downlink individually addressed traffic and a non-AP MLD associated with each second AP MLD has a downlink individually addressed traffic. Without a need to change a frame format of the TIM element, one AP MLD can help another AP MLD indicate whether a non-AP MLD associated with the another AP MLD has a downlink individually addressed traffic. This can improve flexibility of notifying the downlink individually addressed traffic.

In an implementation of any of the foregoing aspects, association identifiers AIDs corresponding to bits of the individually addressed traffic indication information are different from each other. An AID ambiguity can be avoided when it is indicated whether the non-AP MLD has a downlink individually addressed traffic.

In an implementation of any of the foregoing aspects, the individually addressed traffic indication information includes a TIM block corresponding to the first AP MLD and a TIM block corresponding to one second AP MLD, a TIM block corresponding to the first AP MLD is used to indicate whether the non-AP MLD associated with the first AP MLD has a downlink individually addressed traffic, and a TIM block corresponding to one second AP MLD is used to indicate whether a non-AP MLD associated with the second AP MLD has a downlink individually addressed traffic.

Optionally, the individually addressed traffic indication information further includes an index of the second AP MLD, and indexes of the second AP MLD are in a one-to-one correspondence with corresponding TIM blocks of the second AP MLD.

Optionally, one bit of one of the foregoing TIM blocks corresponds to one non-AP MLD, and a bit of the TIM block is used to indicate whether a corresponding non-AP MLD has a downlink individually addressed traffic.

Optionally, association identifiers AIDs corresponding to bits of the TIM block are different from each other.

Optionally, an AID space used by the first AP MLD to allocate an AID to the non-AP MLD associated with the first AP MLD and an AID space used by the second AP MLD to allocate an AID to the non-AP MLD associated with the second AP MLD are independent of each other. The AID space herein may be alternatively a set of to-be-allocated AIDs.

In this solution, TIM indication is performed for different AP MLDs based on blocks. This can avoid an ambiguity of AIDs of non-AP MLDs associated with the different AP MLDs.

According to a fifth aspect, this application provides a method for allocating an association identifier AID to a multi-link device. The method is applied to any AP of an AP MLD. The method for allocating an AID to a multi-link device includes: an $AP_i$ of an AP MLD generates and sends AID allocation information, where the AID allocation information carries an AID allocated to a non-AP MLD, the AID is different from an AID of a non-AP MLD associated with a target AP MLD, and the target AP MLD is any AP MLD in a collocated AP MLD set of the $AP_i$, or the target AP MLD is any AP MLD in a set group in which the collocated AP MLD set of the $AP_i$ is located. The $AP_i$ is any AP of the AP MLD.

Optionally, the AID allocation information is carried in an association response frame. It may be understood that the AID allocation information may be alternatively carried in other frames.

Optionally, if the target AP MLD is any AP MLD in a collocated AP MLD set of the $AP_i$, both the AP MLD and the target AP MLD belong to the collocated AP MLD set of the $AP_i$. If the target AP MLD is any AP MLD in a set group in which the collocated AP MLD set of the $AP_i$ is located, both the AP MLD and the target AP MLD belong to the set group in which the collocated AP MLD set of the $AP_i$ is located, and the set group includes the collocated AP MLD set of the $AP_i$ and a collocated AP MLD set of any AP other than the $AP_i$ in the collocated AP MLD set of the $AP_i$.

Optionally, before an AP of the AP MLD sends an association response frame, the method further includes: The $AP_i$ of the AP MLD receives an association request frame, where the association request frame is used to request to establish a multi-link association with the AP MLD.

In this solution, it is considered that an AID of a non-AP MLD associated with the $AP_i$ and the AID of the non-AP MLD associated with the target AP MLD need to be unique, in other words, need to be different from each other. An AID ambiguity can be avoided when it is indicated whether the non-AP MLD has a downlink individually addressed traffic.

According to a sixth aspect, this application provides a method for allocating an AID to a multi-link device. The method is applied to any STA of a non-AP MLD. The method for allocating an AID to a multi-link device includes: A STA of a non-AP MLD receives AID allocation information, and parses the AID allocation information, to learn that the AID allocation information carries an AID allocated to the non-AP MLD, where the AID is different from an AID of a non-AP MLD associated with a target AP MLD, and the target AP MLD is any AP MLD in a collocated AP MLD set of an $AP_i$, or the target AP MLD is any AP MLD in a set group in which the collocated AP MLD set of the $AP_i$ is located. The $AP_i$ is any AP of the AP MLD.

Optionally, the AID allocation information is carried in an association response frame. It may be understood that the AID allocation information may be alternatively carried in other frames.

Optionally, if the target AP MLD is any AP MLD in a collocated AP MLD set of the $AP_i$, both the AP MLD and the target AP MLD belong to the collocated AP MLD set of the $AP_i$. If the target AP MLD is any AP MLD in a set group in which the collocated AP MLD set of the $AP_i$ is located, both the AP MLD and the target AP MLD belong to the set group in which the collocated AP MLD set of the $AP_i$ is located, and the set group includes the collocated AP MLD set of the $AP_i$ and a collocated AP MLD set of any AP other than the $AP_i$ in the collocated AP MLD set of the $AP_i$.

Optionally, before the STA of the non-AP MLD receives an association response frame, the method further includes: the STA of the non-AP MLD generates and sends an association request frame, where the association request frame is used to request to establish a multi-link association with the AP MLD.

According to a seventh aspect, this application provides a communications apparatus. The communications apparatus may be an AP MLD or a chip in the AP MLD, such as a Wi-Fi chip, and includes: a processing unit, configured to generate AID allocation information, where the AID allocation information carries an AID allocated to a non-AP MLD, the AID is different from an AID of a non-AP MLD associated with a target AP MLD, and the target AP MLD is any AP MLD in a collocated AP MLD set of an $AP_i$, or the target AP MLD is any AP MLD in a set group in which the collocated AP MLD set of the $AP_i$ is located; and a transceiver unit, configured to send the association response frame. The $AP_i$ is any AP of the AP MLD.

Optionally, the AID allocation information is carried in an association response frame. It may be understood that the AID allocation information may be alternatively carried in other frames.

Optionally, if the target AP MLD is any AP MLD in a collocated AP MLD set of the $AP_i$, both the AP MLD and the target AP MLD belong to the collocated AP MLD set of the $AP_i$. If the target AP MLD is any AP MLD in a set group in which the collocated AP MLD set of the $AP_i$ is located, both the AP MLD and the target AP MLD belong to the set group in which the collocated AP MLD set of the $AP_i$ is located, and the set group includes the collocated AP MLD set of the $AP_i$ and a collocated AP MLD set of any AP other than the $AP_i$ in the collocated AP MLD set of the $AP_i$.

Optionally, the transceiver unit is further configured to receive an association request frame, where the association request frame is used to request to establish a multi-link association with the AP MLD.

According to an eighth aspect, this application provides a communications apparatus. The communications apparatus may be a non-AP MLD or a chip in the non-AP MLD, such as a Wi-Fi chip, and includes: a transceiver unit, configured to receive AID allocation information from an AP of an AP MLD; and a processing unit, configured to parse the received AID allocation information, to learn that the AID allocation information carries an AID allocated to the non-AP MLD, where the AID is different from an AID of a non-AP MLD associated with a target AP MLD, and the target AP MLD is any AP MLD in a collocated AP MLD set of an $AP_i$, or the target AP MLD is any AP MLD in a set group in which the collocated AP MLD set of the $AP_i$ is located. The $AP_i$ is any AP of the AP MLD.

Optionally, the AID allocation information is carried in an association response frame. It may be understood that the AID allocation information may be alternatively carried in other frames.

Optionally, if the target AP MLD is any AP MLD in a collocated AP MLD set of the $AP_i$, both the AP MLD and the target AP MLD belong to the collocated AP MLD set of the $AP_i$. If the target AP MLD is any AP MLD in a set group in which the collocated AP MLD set of the $AP_i$ is located, both the AP MLD and the target AP MLD belong to the set group in which the collocated AP MLD set of the $AP_i$ is located, and the set group includes the collocated AP MLD set of the $AP_i$ and a collocated AP MLD set of any AP other than the $AP_i$ in the collocated AP MLD set of the $AP_i$.

Optionally, the processing unit is further configured to generate an association request frame; and the transceiver unit is further configured to send the association request frame, where the association request frame is used to request to establish a multi-link association with the AP MLD.

According to a ninth aspect, this application provides a communications apparatus. The communications apparatus is specifically a first AP MLD or a first AP of the first AP MLD, and includes a processor and a transceiver. The processor is configured to support the first AP MLD in performing a corresponding function in the foregoing method in the first aspect. The transceiver is configured to support communication between the first AP MLD and a non-access-point multi-link device (also referred to as a station multi-link device), and send information, a frame, a data packet, an instruction, or the like in the foregoing method to the station multi-link device. The first AP MLD may further include a memory. The memory is configured to be coupled to the processor, and the memory stores program instructions and data that are necessary for the first AP MLD.

Specifically, the processor is configured to generate individually addressed traffic indication information, where the individually addressed traffic indication information is used to indicate whether a non-AP MLD associated with the first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which a first AP is located belongs. The transceiver is configured to send the individually addressed traffic indication information on a first link, where the first link is a working link of the first AP.

According to a tenth aspect, this application provides a communications apparatus. The communications apparatus is specifically a non-access-point multi-link device (also referred to as a station multi-link device) or a first STA of a non-AP MLD, and includes a processor and a transceiver. The processor is configured to support the station multi-link device in performing a corresponding function in the foregoing method in the second aspect. The transceiver is configured to support communication between the station multi-link device and a first AP MLD, and receive information, a frame, a data packet, an instruction, or the like in the foregoing method from the first AP MLD. The station multi-link device may further include a memory. The memory is configured to be coupled to the processor, and the memory stores program instructions and data that are necessary for the station multi-link device.

Specifically, the transceiver is configured to receive individually addressed traffic indication information on a first link on which the first STA works, where the individually addressed traffic indication information is used to indicate whether a non-AP MLD associated with a first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which a first AP is located belongs. The processor is configured to determine, according to the received individually addressed traffic indication information, whether the non-AP MLD has a downlink individually addressed traffic.

According to an eleventh aspect, this application provides a communications apparatus. The communications apparatus is specifically an AP MLD or an $AP_i$ of the AP MLD, and includes a processor and a transceiver. The processor is configured to support the AP MLD in performing a corresponding function in the foregoing method in the fifth aspect. The transceiver is configured to support communication between the AP MLD and a non-access-point multi-link device (also referred to as a station multi-link device), and send information, a frame, a data packet, an instruction, or the like in the foregoing method to the station multi-link device. The AP MLD may further include a memory. The memory is configured to be coupled to the processor, and the memory stores program instructions and data that are necessary for the AP MLD.

Specifically, the processor is configured to generate AID allocation information, where the AID allocation information carries an AID allocated to a non-AP MLD, the AID is different from an AID of a non-AP MLD associated with a target AP MLD, and the target AP MLD is any AP MLD in a collocated AP MLD set of an $AP_i$, or the target AP MLD is any AP MLD in a set group in which the collocated AP MLD set of the $AP_i$ is located. The transceiver is configured to send the AID allocation information. The AID allocation information is carried in an association response frame. It may be understood that the AID allocation information may be alternatively carried in other frames. The $AP_i$ is any AP of the AP MLD.

Optionally, the transceiver is further configured to receive an association request frame, where the association request frame is used to request to establish a multi-link association with the AP MLD.

According to a twelfth aspect, this application provides a communications apparatus. The communications apparatus is specifically a non-access-point multi-link device (also referred to as a station multi-link device), and includes a processor and a transceiver. The processor is configured to support the station multi-link device in performing a corresponding function in the foregoing method in the sixth aspect. The transceiver is configured to support communication between the station multi-link device and an AP MLD, and receive information, a frame, a data packet, an instruction, or the like in the foregoing method from the AP MLD. The station multi-link device may further include a memory. The memory is configured to be coupled to the processor, and the memory stores program instructions and data that are necessary for the station multi-link device.

Specifically, the transceiver is configured to receive AID allocation information. The processor is configured to parse the received AID allocation information, to learn that the AID allocation information carries an AID allocated to the non-AP MLD, where the AID is different from an AID of a non-AP MLD associated with a target AP MLD, and the target AP MLD is any AP MLD in a collocated AP MLD set of an $AP_i$, or the target AP MLD is any AP MLD in a set group in which the collocated AP MLD set of the $AP_i$ is located. The AID allocation information is carried in an association response frame. It may be understood that the AID allocation information may be alternatively carried in other frames. The $AP_i$ is any AP of the AP MLD.

Optionally, the processor is further configured to generate an association request frame; and the transceiver is further configured to send the association request frame, where the association request frame is used to request to establish a multi-link association with the AP MLD.

According to a thirteenth aspect, this application provides a chip or a chip system, including an input/output interface and a processing circuit. The processing circuit is configured to generate individually addressed traffic indication information, where the individually addressed traffic indication information is used to indicate whether a non-AP MLD associated with the first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which a first AP is located belongs. The input/output interface is configured to send the individually addressed traffic indication information on a first link, where the first link is a working link of the first AP.

In a possible design, the input/output interface is configured to receive individually addressed traffic indication information on a first link, where the individually addressed traffic indication information is used to indicate whether a non-AP MLD associated with the first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which a first AP is located belongs. The processing circuit is configured to determine, according to the received individually addressed traffic indication information, whether the non-AP MLD has a downlink individually addressed traffic.

According to a fourteenth aspect, this application provides a chip or a chip system, including an input/output interface and a processing circuit. The processing circuit is configured to generate AID allocation information, where the AID allocation information carries an AID allocated to a non-AP MLD, the AID is different from an AID of a non-AP MLD associated with a target AP MLD, and the target AP MLD is any AP MLD in a collocated AP MLD set of a reporting AP, or the target AP MLD is any AP MLD in a set group in which the collocated AP MLD set of the $AP_i$ is located. The input/output interface is configured to send the association response frame.

In a possible design, the input/output interface is configured to receive AID allocation information. The processing circuit is configured to parse the received AID allocation information, to learn that the AID allocation information carries an AID allocated to the non-AP MLD, where the AID is different from an AID of a non-AP MLD associated with a target AP MLD, and the target AP MLD is any AP MLD in a collocated AP MLD set of the reporting AP, or the target AP MLD is any AP MLD in a set group in which the collocated AP MLD set of the $AP_i$ is located.

According to a fifteenth aspect, this application provides a computer-readable storage medium, and the computer-readable storage medium stores instructions. When the instructions are run on a computer, the computer is enabled to perform the foregoing individually addressed traffic indication method applicable to multiple links according to the first aspect or the second aspect.

According to a sixteenth aspect, this application provides a computer-readable storage medium, and the computer-readable storage medium stores instructions. When the instructions are run on a computer, the computer is enabled to perform the foregoing method for allocating an association identifier AID to a multi-link device according to the fifth aspect or the sixth aspect.

According to a seventeenth aspect, this application provides a computer program product including instructions. When the computer program product runs on a computer, the computer is enabled to perform the foregoing individually addressed traffic indication method applicable to multiple links according to the first aspect or the second aspect.

According to an eighteenth aspect, this application provides a computer program product including instructions. When the computer program product runs on a computer, the computer is enabled to perform the foregoing method for allocating an association identifier AID to a multi-link device according to the fifth aspect or the sixth aspect.

Embodiments of this application can be implemented to help some APs or all APs of some AP MLDs indicate whether station multi-link devices associated with the AP MLDs have downlink individually addressed traffics, to assist the station multi-link devices in correctly receiving downlink individually addressed traffics.

BRIEF DESCRIPTION OF DRAWINGS

To describe the technical solutions in embodiments of this application more clearly, the following briefly describes the accompanying drawings used in describing embodiments.

DESCRIPTION OF EMBODIMENTS

Figure 1:
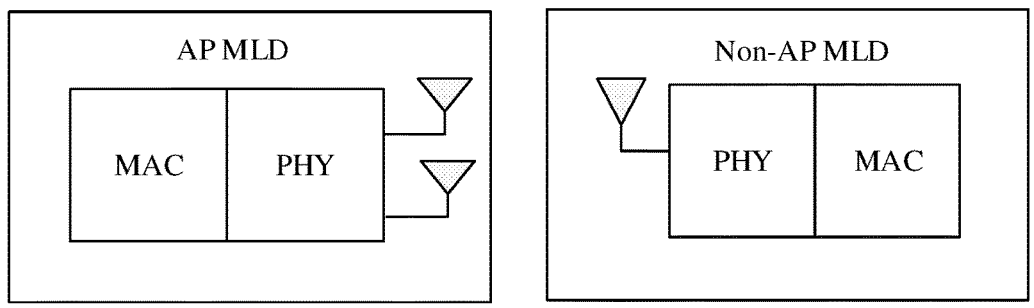
FIG. 1 is a schematic diagram of structures of an AP MLD and a non-AP MLD according to an embodiment of this application.

The following clearly describes the technical solutions in embodiments of this application with reference to the accompanying drawings in embodiments of this application.

To better understand an individually addressed traffic indication method applicable to multiple links and a related apparatus that are disclosed in embodiments of this application, related concepts in embodiments of this application are first described.

1. Multi-Link Device

A wireless communications system to which embodiments of this application are applicable may be a wireless local area network (wireless local area network, WLAN) or a cellular network, and the individually addressed traffic indication method may be implemented by a communications device in the wireless communications system or a chip or a processor in the communications device. The communications apparatus may be a wireless communications apparatus that supports multiple links for parallel transmission, and for example, is referred to as a multi-link device (Multi-link device, MLD) or a multi-band device (multi-band device). Compared with a device that supports only single-link transmission, the multi-link device has higher transmission efficiency and a higher throughput.

A multi-link device includes one or more affiliated stations (affiliated STA). One affiliated station is a logical station that can work on one link. The affiliated station may be an access point (access point, AP) or a non-access-point station (Non-access point station, Non-AP STA). For ease of description, a multi-link device whose affiliated station is an AP in this application may be referred to as a multi-link AP or a multi-link AP device or an AP multi-link device (AP multi-link device, AP MLD). A multi-link device whose affiliated station is a non-AP STA may be referred to as a multi-link non-AP or a multi-link non-AP device or a non-AP multi-link device (Non-AP multi-link device, Non-AP MLD). For ease of description, that "a multi-link device includes an affiliated station" is also briefly described as "a multi-link device includes a station" in embodiments of this application.

A multi-link device includes one or more affiliated stations (affiliated STA). In other words, one multi-link device may include multiple logical stations. Each logical station works on one link, but multiple logical stations are allowed to work on a same link.

The multi-link device may implement wireless communication according to 802.11 family standards. For example, a station complying with an extremely high throughput (extremely high throughput, EHT), or a station complying with 802.11be or compatible with a station supporting 802.11be implements communication with another device. Certainly, the another device may be a multi-link device, or may not be a multi-link device.

For example, the multi-link device in this embodiment of this application may be a single-antenna device, or may be a multi-antenna device. For example, the device may be a device with more than two antennas. A quantity of antennas included in the multi-link device is not limited in this embodiment of this application. In embodiments of this application, the multi-link device may allow services of a same access type to be transmitted on different links, and even allow a same data packet to be transmitted on different links; or may not allow services of the same access type to be transmitted on different links, but allow services of different access types to be transmitted on different links.

For example, a multi-link device is an apparatus with a wireless communication function, and the apparatus may be an entire device, or may be a chip, a processing system, or the like installed in the entire device, and a device in which the chip or the processing system is installed may implement methods and functions of embodiments of this application under control of the chip or the processing system. For example, the non-AP MLD in embodiments of this application has a wireless transceiver function, which may be supporting the 802.11 series protocols, and may communicate with an AP MLD or another non-AP MLD or a single-link device. For example, a STA MLD is any user communications apparatus that allows a user to communicate with an AP and further communicate with the WLAN. For example, the non-AP MLD may be user equipment that can be connected to the Internet, such as a tablet computer, a desktop computer, a laptop computer, a notebook computer, an ultra-mobile personal computer (Ultra-mobile Personal Computer, UMPC), a handheld computer, a netbook, a personal digital assistant (Personal Digital Assistant, PDA), or a mobile phone, or an Internet of things node in the Internet of things, a vehicle-mounted communications apparatus in the Internet of vehicles, or the like. The non-AP MLD may be alternatively a chip and a processing system in these terminals.

The AP MLD in embodiments of this application is an apparatus that provides a service for the non-AP MLD, and can support the 802.11 series protocols. For example, the AP MLD may be a communications entity such as a communications server, a router, a switch, and a network bridge, or the AP MLD may include a macro base station, a micro base station, a relay node, and the like of various forms. Certainly, the AP MLD may be alternatively a chip and a processing system in these devices of various forms, thereby implementing the methods and functions of embodiments of this application. In addition, the multi-link device can support high-rate and low-delay transmission. With continuous evolution of application scenarios of wireless local area networks, the multi-link device may be alternatively applied to more scenarios, such as sensor nodes (such as smart water meters, smart power meters, and smart air detection nodes) in smart cities, smart devices (such as smart cameras, projectors, display screens, televisions, stereos, refrigerators, and washing machines) in smart households, nodes in the Internet of things, entertainment terminals (such as AR, VR, and other wearable devices), smart devices (such as printers and projectors) in smart offices, Internet of vehicles devices in the Internet of vehicles, and some infrastructures (such as vending machines, self-service navigation desks in supermarkets, self-service cash registers, and self-service ordering machines) in daily life scenarios. Specific forms of the non-AP MLD and the AP MLD are not particularly limited in embodiments of this application, and are only an example for description herein. The 802.11 protocol may be a protocol that supports 802.11be or is compatible with 802.11be.

Frequency bands in which the multi-link device operates may include but are not limited to sub-1 GHz, 2.4 GHz, 5 GHz, 6 GHz, and high-frequency 60 GHz.

For example, the multi-link device in this embodiment of this application may be a single-antenna device, or may be a multi-antenna device. For example, the multi-link device in embodiments of this application may be a device with two or more antennas. A quantity of antennas included in the multi-link device is not limited in this embodiment of this application. FIG. 1 is a schematic diagram of structures of an AP MLD and a non-AP MLD according to an embodiment of this application. FIG. 1 is a schematic diagram of a structure of an AP MLD with multiple antennas and a non-AP MLD with a single antenna. An 802.11 standard focuses on a physical layer (Physical layer, PHY) part and a media access control (Media Access Control, MAC) layer part in the AP MLD and the non-AP MLD.

2. Link Identifier

The link identifier represents one station working on one link. In other words, if there are more than one station on one link, more than one link identifier represents the stations. A link mentioned below sometimes also represents a station operating on the link.

When data is transmitted between an AP MLD and a non-AP MLD, a link identifier may be used to identify a link or a station on a link. Before communication, the AP MLD and the non-AP MLD may negotiate about or communicate a correspondence between a link identifier and a link or a station on a link. Therefore, during data transmission, a link identifier is carried without a need of transmitting a large amount of signaling information to indicate a link or a station on a link. This reduces signaling overheads and improves transmission efficiency.

In an example, a management frame, such as a beacon (beacon) frame, sent by the AP MLD when establishing a basic service set (basic service set, BSS) carries an element, and the element includes multiple link identification information fields. The link identification information field may indicate a correspondence between a link identifier and a station working on a link corresponding to the link identifier. The link identification information field includes not only the link identifier, but also one or more of the following information: a media access control (Media Access Control, MAC) address, an operation set, and a channel number. One or more of the MAC address, the operation set, and the channel number may indicate one link. For an AP, a MAC address of the AP is also a BSSID (basic service set identifier, basic service set identifier) of the AP. In another example, in a multi-link device association process, the AP MLD and the non-AP MLD negotiate about multiple link identification information fields. The multi-link device association means that one AP of the AP MLD is associated with one STA of the non-AP MLD once, and the association may help multiple STAs of the non-AP MLD be respectively associated with multiple APs of the AP MLD, where one STA is associated with one AP.

In subsequent communication, the AP MLD or the non-AP MLD uses a link identifier to represent a station of the non-AP MLD, and the link identifier may further represent one or more attributes of a MAC address, a working operation set, and a channel number of the station. The MAC address may be replaced with an association identifier of the AP MLD after the association. Optionally, if multiple stations are working on one link, a link identifier (which is a digital ID) means including not only an operation set on which a link is located and a channel number, but also an identifier of a station working on the link, such as a MAC address of the station or an association identifier (association identifier, AID) of the station.

3. Traffic Indication Map Element

Figure 2:
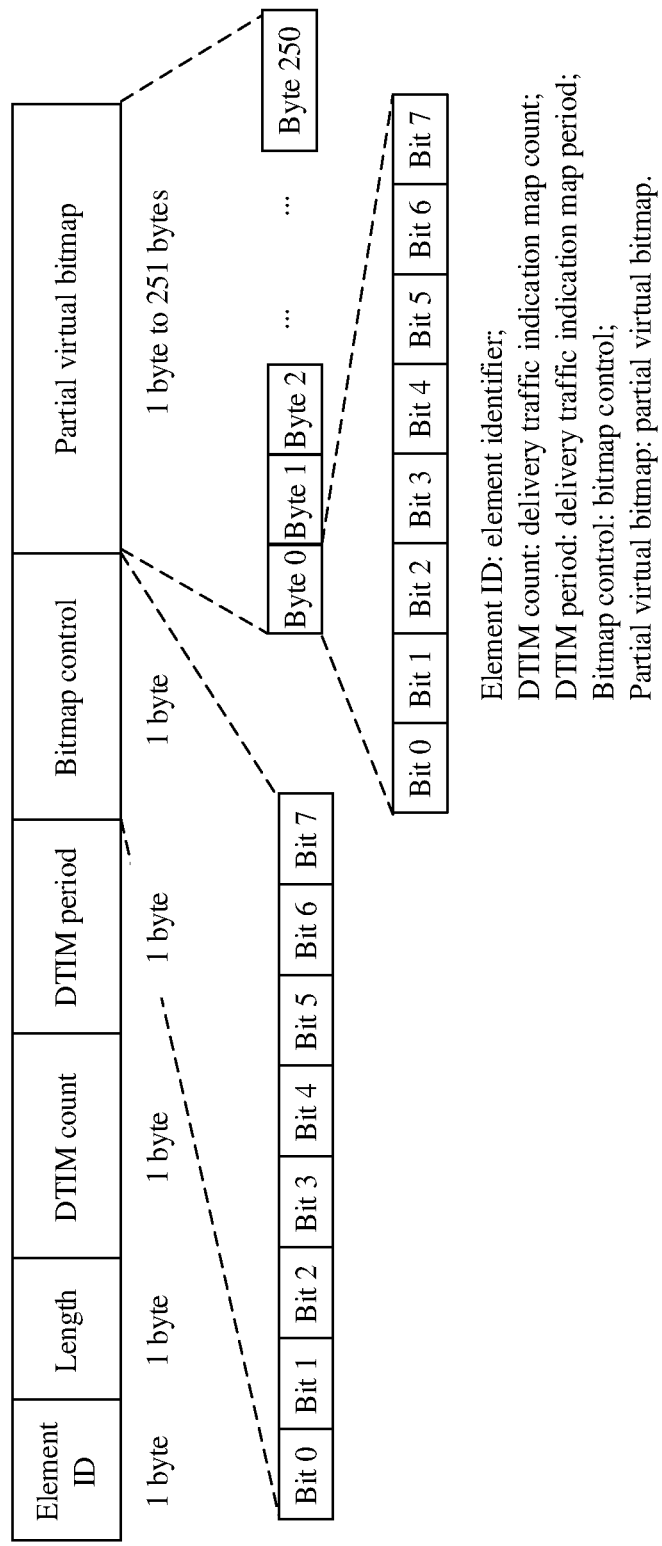
FIG. 2 is a schematic diagram of a frame format of a TIM element according to an embodiment of this application.

A traffic indication map (traffic indication map, TIM) beacon frame and a delivery traffic indication map (delivery traffic indication map, DTIM) beacon frame each carry a traffic indication map (traffic indication map, TIM) element. FIG. 2 is a schematic diagram of a frame format of a TIM element according to an embodiment of this application. As shown in FIG. 2, a frame format of a TIM element field includes:

Element identifier (identifier, ID) field: used to identify an element shown in FIG. 2 as a TIM element.

Length field: used to indicate a length of the TIM element, and collect statistics about a total length after the field, to be specific, a total length of a DTIM count field, a DTIM period field, a bitmap control field, and a partial virtual bitmap field, in units of bytes.

DTIM count (DTIM count) field: used to indicate how many TIM beacon frames appear before arrival of a next DTIM beacon frame from a current beacon frame carrying the TIM element. In other words, the DTIM count field is a count value, and the count value is variable. When a value of the DTIM count field is 0, it indicates that the current beacon frame is a DTIM beacon frame. When the value of the DTIM count field is not 0 or is non-zero, it indicates that the current beacon frame is a TIM beacon frame.

DTIM period (DTIM period) field: used to indicate period duration of the DTIM beacon frame, in other words, an arrival interval, where the arrival interval is in a unit of a TIM beacon frame period. For example, if a DTIM period is set to 1, a DTIM count in each TIM element field is equal to 0, in other words, each beacon frame is a DTIM beacon frame.

Bitmap control (Bitmap control) field: As shown in FIG. 2, a bit 0 in the bitmap control field is used to indicate whether an access point AP sends a group addressed data traffic after sending a DTIM beacon frame, in other words, the bit 0 in the bitmap control field in the DTIM beacon frame indicates whether the AP caches a group addressed traffic, and the group addressed traffic is not sent through a group addressed AID; bits 1 to 7 in the bitmap control field are used to indicate an offset of a partial virtual bitmap (partial virtual bitmap), and the offset is in a unit of a byte (namely, 8 bits).

Partial virtual bitmap (partial virtual bitmap): each bit of the partial virtual bitmap field corresponds to one association identifier (association identifier, AID), and is used to indicate whether a station corresponding to the AID has an individually addressed traffic. Alternatively, each bit of the partial virtual bitmap field corresponds to one group addressed AID, and is used to indicate whether a group of stations corresponding to a group addressed AID have downlink individually addressed traffics. The partial virtual bitmap field is some bits of a traffic indication virtual bitmap (traffic indication virtual bitmap) field, where the traffic indication virtual bitmap field is of 251 bytes, and is used to indicate whether stations corresponding to an AID 0 to an AID 2007 have downlink individually addressed traffics.

An element ID field, the length field, the DTIM count field, the DTIM period field, and the bitmap control field each occupy one byte.

4. Multiple Basic Service Identifier Set (Multiple BSSID Set)

The multiple basic service set identifier set (Multiple BSSID set, which may be referred to as a multiple BSSID set) may be understood as a set of some cooperating APs. All cooperating APs use a same operation set, channel number, and antenna interface. In the multiple BSSID set, there is only one AP with a transmitted (Transmitted) BSSID, and other APs are APs with non-transmitted (Non-transmitted) BSSIDs. Multiple BSSID set information (namely, a multiple BSSID element) is carried in a beacon frame or a probe response frame or a neighbor report sent by an AP with a transmitted BSSID. Information about a BSSID of the AP with the non-transmitted BSSID is derived by a station based on the beacon frame or the probe response frame, or a multiple BSSID element in the neighbor report, or the like. The BSSID of the AP with the non-transmitted BSSID is calculated based on a BSSID of the AP with the transmitted BSSID and a BSSID Index field in a Multiple BSSID-Index element in a non-transmitted BSSID profile of the BSSID of the AP with the non-transmitted BSSID. For a specific method, refer to the Draft 802.11REVmd_D3.0 protocol.

The multiple BSSID set may be alternatively understood as including multiple APs. Each AP manages one BSS, and different APs may have different SSIDs and permissions, such as security mechanisms or transmission opportunities.

In the multiple BSSID set, only an AP whose BSSID is a transmitted BSSID can send a beacon frame (beacon) and a probe response frame (Probe Response), whereas an AP with a non-transmitted BSSID does not send a beacon frame. Therefore, if a probe request frame (Probe Request) sent by a STA is sent to an AP, in the multiple BSSID set, whose BSSID is a non-transmitted BSSID, an AP, in the multiple BSSID set, whose BSSID is a transmitted BSSID helps respond to send a probe response frame.

A BSSID of one of the multiple APs in the multiple BSSID set is configured as a transmitted (Transmitted) BSSID, and the AP with the transmitted BSSID may be referred to as a transmitted (transmitted) AP; BSSIDs of the other APs are configured as non-transmitted (Non-transmitted) BSSIDs, and the APs with the non-transmitted BSSID may be referred to as non-transmitted (Non-transmitted) APs.

Figures 3, 4A:
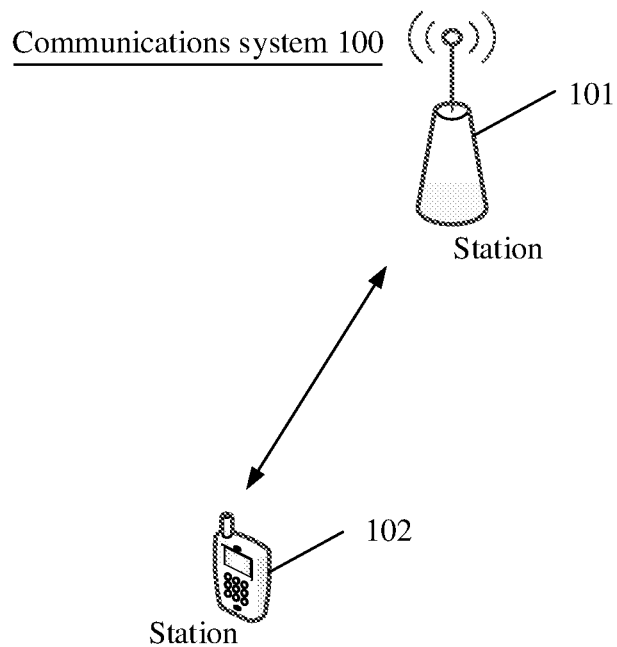
FIG. 3 is a schematic diagram of a frame format of a multiple BSSID element according to an embodiment of this application.
FIG. 4a is a schematic diagram of a structure of a communications system 100 according to an embodiment of this application.

A beacon frame sent by the transmitted AP may include a multiple BSSID element, and a frame format of the multiple BSSID element is shown in FIG. 3. FIG. 3 is a schematic diagram of a frame format of a multiple BSSID element according to an embodiment of this application. The multiple BSSID element includes an element ID field, a length field, a max BSSID indicator field, and an optional subelement field. The max BSSID indicator field is used to indicate a maximum quantity N of BSSIDs included in the multiple BSSID set, and the optional subelement field includes information about a BSSID of an AP with a non-transmitted BSSID.

A maximum quantity of APs allowed in the multiple BSSID set is $2^n$, where n is a value indicated by the MaxBSSID Indicator field in the multiple BSSID element shown in FIG. 3, and $N=2^n$. Therefore, bits 1 to $2^n-1$ of the traffic indication virtual bitmap field may be respectively allocated to APs with non-transmitted BSSIDs in the multiple BSSID set to respectively indicate whether the APs with the non-transmitted BSSIDs whose NonTxBSS IDs (identifiers) are 1 to $2^n-1$ have group addressed traffics. A value of the NonTxBSSID is equal to a value of the BSSID Index field in the Multiple BSSID-Index element in the non-transmitted BSSID profile in the multiple BSSID element. The non-transmitted BSSID profile is in the optional subelement field.

Although embodiments of this application are mainly described by using a network in which IEEE 802.11 is deployed as an example, a person skilled in the art easily understand that various aspects in this application can be extended to other networks using various standards or protocols, for example, Bluetooth (Bluetooth), a high performance radio LAN (high performance radio LAN, HIP-ERLAN) (a wireless standard similar to an IEEE 802.11 standard and mainly used in Europe), a wide area network (WAN), a wireless local area network (wireless local area network, WLAN), a personal area network (personal area network, PAN), or other networks that are currently known or will be developed in the future. Therefore, the various aspects provided in this application are applicable to any suitable wireless network regardless of coverage and a wireless access protocol.

FIG. 4a is a schematic diagram of a structure of a communications system 100 according to an embodiment of this application. In FIG. 4a, a wireless local area network is used as an example to describe the communications system 100 applied to this embodiment of this application. The communications system 100 includes a station 101 and a station 102. The station 101 and the station 102 may use multiple links for communication, achieving an effect of improving a throughput. The station 101 may be a multi-link device, and the station 102 may be a single-link device, a multi-link device, or the like. In one scenario, the station 101 is an AP MLD, and the station 102 is a non-AP MLD or a station (such as a single-link station). In another scenario, the station 101 is a non-AP MLD, and the station 102 is an AP (such as a single-link AP) or an AP MLD. In still another scenario, the station 101 is an AP MLD, and the station 102 is an AP MLD or an AP; in yet another scenario, the station 101 is a non-AP MLD, and the station 102 is a non-AP MLD or a STA (such as a single-link station). Certainly, the wireless local area network may further include other devices. A quantity and types of devices shown in FIG. 4a are merely examples.

Figure 4B:
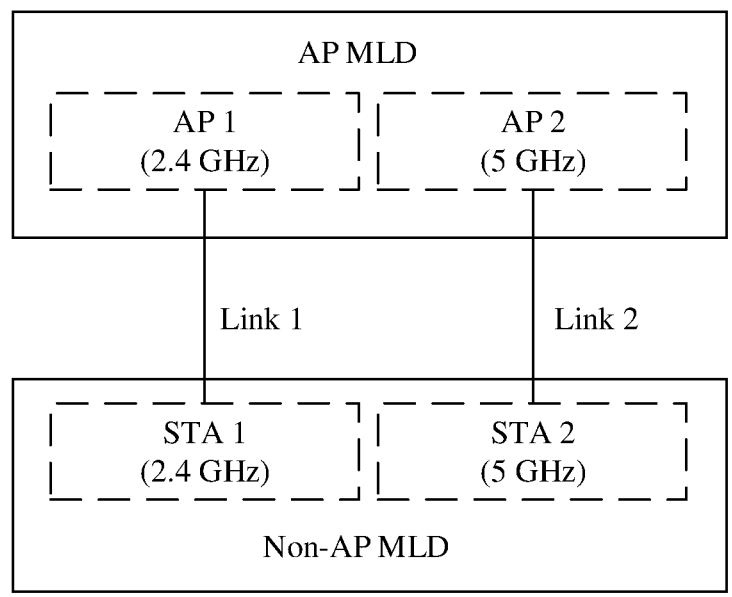
FIG. 4b is a schematic diagram of a structure of a communications system 200 according to an embodiment of this application.
Figure 4C:
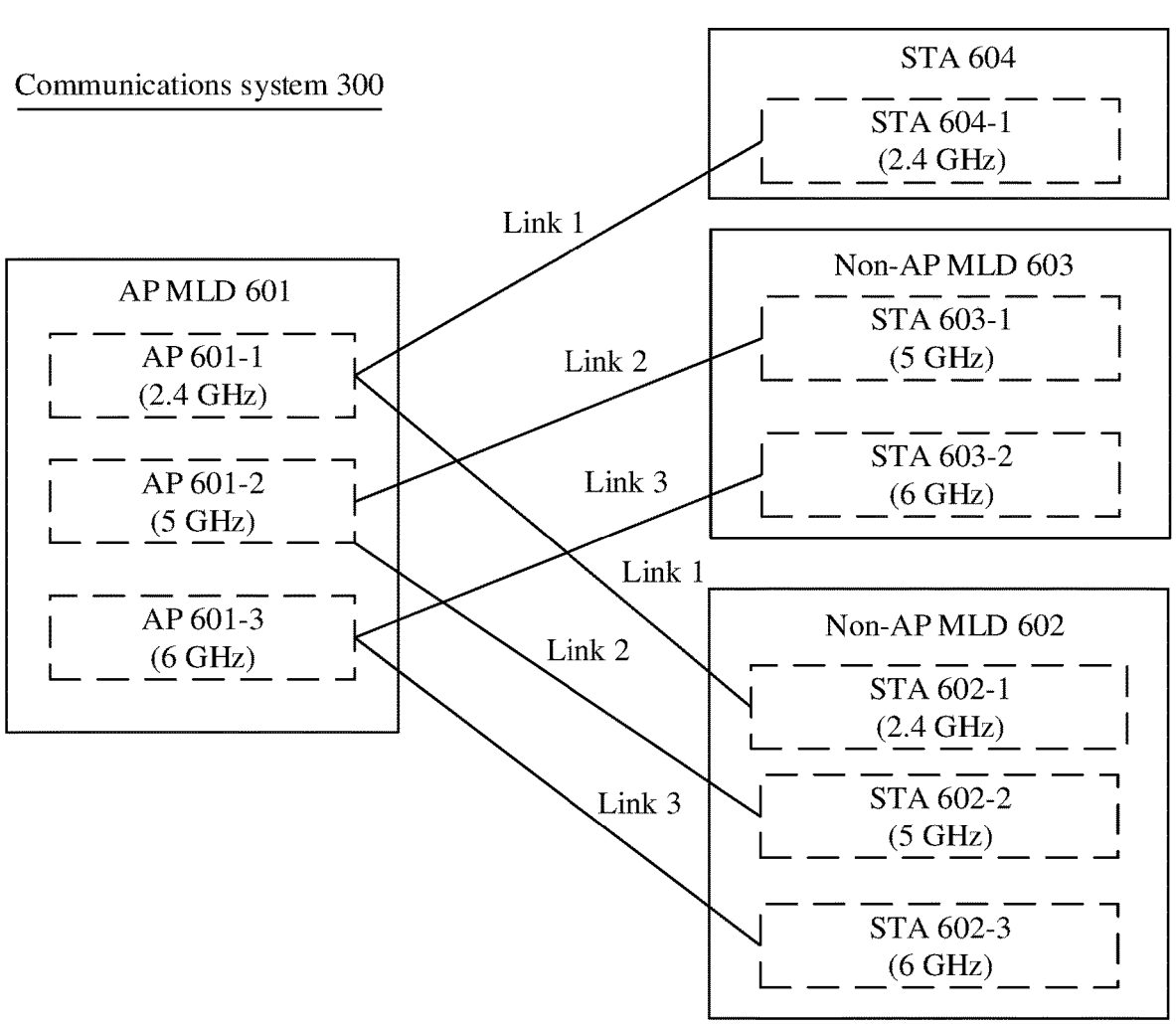
FIG. 4c is a schematic diagram of a structure of a communications system 300 according to an embodiment of this application.

FIG. 4b is a schematic diagram of a structure of a communications system 200 according to an embodiment of this application. FIG. 4c is a schematic diagram of a structure of a communications system 300 according to an embodiment of this application. FIG. 4b and FIG. 4c are schematic diagrams of structures of the communications system 200 and the communications system 300, respectively. The communications system 200 and the communications system 300 are described by using an example in which a multi-link device in the wireless local area network communicates with other devices through multiple links.

Specifically, FIG. 4b shows a scenario of communication between an AP MLD and a non-AP MLD. The AP MLD includes an affiliated AP 1 and an affiliated AP 2, the non-AP MLD includes an affiliated STA 1 and an affiliated STA 2, and the AP MLD and the non-AP MLD communicate through a link 1 and a link 2 in parallel.

FIG. 4c shows a scenario in which an AP MLD 601 communicates with a non-AP MLD 602, a non-AP MLD 603, and a STA 604. The AP MLD 601 includes an affiliated AP 601-1 to an affiliated AP 601-3. The non-AP MLD 602 includes three affiliated stations: a STA 602-1, a STA 602-2, and a STA 602-3. The non-AP MLD 603 includes two affiliated stations: a STA 603-1 and a STA 603-2. A STA 604-1 and the STA 604 are single-link devices. The AP MLD 601 may separately communicate with the non-AP MLD 602 through the link 1, the link 2, and a link 3, communicate with the non-AP MLD 603 through the link 2 and the link 3, and communicate with the STA 604 through the link 1. In an example, the STA 604 works in a 2.4 GHz band; in the non-AP MLD 603, the STA 603-1 works in a 5 GHz band, and the STA 603-2 works in a 6 GHz band; in the non-AP MLD 602, the STA 602-1 works in the 2.4 GHz band, the STA 602-2 works in the 5 GHz band, and the STA 602-3 works in the 6 GHz band. Uplink or downlink data may be transmitted between the AP 601-1 working in the 2.4 GHz band in the AP MLD 601 and the STA 604 and the STA 602-1 in the non-AP MLD 602 through the link 1. Uplink or downlink data may be transmitted between the AP 601-2 working in the 5 GHz band in the AP MLD 601 and the STA 603-1 working in the 5 GHz band in the non-AP MLD 603 through the link 2, and uplink or downlink data may be further transmitted between the AP 601-2 and the STA 602-2 working in the 5 GHz band in the non-AP MLD 602 through the link 2. Uplink or downlink data may be transmitted between the AP 601-3 working in the 6 GHz band in the AP MLD 601 and the STA 602-3 working in the 6 GHz band in the non-AP MLD 602 through the link 3, and uplink or downlink data may be further transmitted between the AP 601-3 and the STA 603-2 in the non-AP MLD through the link 3.

It may be understood that, FIG. 4b shows only an example in which the AP MLD supports two frequency bands, and FIG. 4c shows only an example in which the AP MLD 601 supports three frequency bands (2.4 GHz, 5 GHz, and 6 GHz), each frequency band corresponds to one link, and the AP MLD 601 may work on one or more links of the link 1, the link 2, or the link 3. On the AP side or the STA side, the link herein may be further understood as a station operating on the link. In practical applications, the AP MLD and the non-AP MLD may further support more or fewer frequency bands, that is, the AP MLD and the non-AP MLD may work on more links or fewer links. This is not limited in embodiments of this application.

Figure 5:
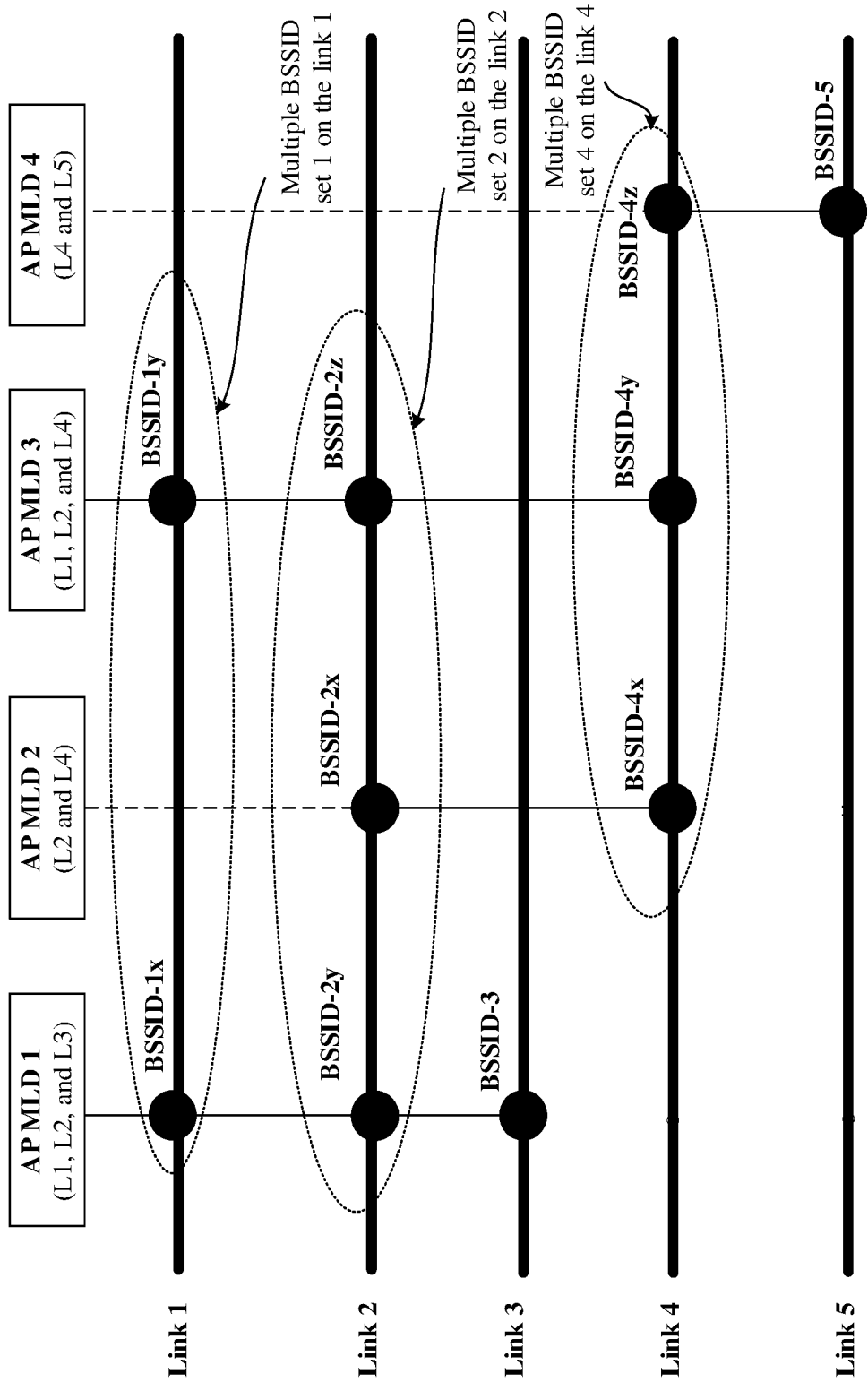
FIG. 5 is a schematic diagram of an architecture of a plurality of multiple BSSID sets according to an embodiment of this application.

FIG. 5 is a schematic diagram of an architecture of a plurality of multiple BSSID sets according to an embodiment of this application. In other words, AP MLDs shown in FIG. 5 are a collocated AP MLD set (collocated AP MLD set).

BSSID-1x, BSSID-1y, BSSID-2x, BSSID-2y, BSSID-2z, BSSID-4x, BSSID-4y, BSSID-4z, BSSID-3, and BSSID-5 are MAC address identifiers, and are used to identify corresponding APs. It is assumed that an AP whose MAC address identifier ends with x is a transmitted BSSID AP, an AP whose MAC address identifier ends with y or z is a non-transmitted BSSID AP, and an AP whose MAC address identifier ends with only a number is a common AP. The common AP is an AP that does not belong to a multiple BSSID set. For example, a transmitted BSSID AP in a multiple BSSID set 1 is an AP 1x whose MAC address identifier is BSSID_1x, a non-transmitted BSSID AP in the multiple BSSID set 1 is an AP 1y whose MAC address identifier is BSSID_1y, a transmitted BSSID AP in a multiple BSSID set 2 is an AP 2x whose MAC address identifier is BSSID_2x, and non-transmitted BSSID APs in the multiple BSSID set 2 include an AP 2y whose MAC address identifier is BSSID_2y and an AP 2z whose MAC address identifier is BSSID_2z.

A collocated AP MLD set of a reporting AP includes the following APs, where the reporting AP is an AP that sends a management frame, and the management frame carries information about the following multiple APs. The management frame is, for example, a beacon frame or a probe response frame. The reporting AP includes a transmitted AP and a common AP in a BSSID set. The collocated AP MLD set of the reporting AP includes the following APs:

(1) all APs that belong to the same AP MLD as the reporting AP, or all APs in the AP MLD in which the reporting AP is located;

(2) all APs in an AP MLD in which a non-transmitted AP in the same multiple BSSID set as the reporting AP (or transmitted AP) is located; or all APs in an AP MLD in which a non-transmitted AP in a multiple BSSID set in which the reporting AP (or transmitted AP) is located is located; and (3) all APs in an AP MLD that meets the following two conditions, where the two conditions are: 1) at least one AP of the AP MLD is in the same multiple BSSID set as an AP in the AP MLD in which the reporting AP is located; and 2) there is no AP in the AP MLD working on the same link as the reporting AP.

Optionally, in an implementation, one AP MLD includes only one AP.

Optionally, the reporting AP may be a common AP in an AP MLD (such as an AP 3 whose MAC address identifier is BSSID_3 and an AP 5 whose MAC address identifier is BSSID_5 in FIG. 5) or a transmitted AP in a multiple BSSID set, and can send the individually addressed traffic indication information described in this application.

For example, the AP 1x in FIG. 5 is used as the reporting AP, and then the APs included in the collocated AP MLD set of the AP 1x include:

(1) all APs in the same AP MLD 1 as the AP 1x, namely, the AP 1x, the AP 2y, and the AP 3;
(2) all APs in an AP MLD 3 in which a non-transmitted AP (namely, the AP 1y) in the same multiple BSSID set 1 as the AP 1x, namely, the AP 1y, the AP 2z, and an AP 4y; and
(3) the AP 2x and an AP 4x included in an AP MLD that meets the foregoing conditions 1) and 2) in FIG. 5, namely, an AP MLD 2, where the AP 2x in the AP MLD 2 and the AP 2y in the AP MLD 1 are in the same multiple BSSID set 2, and no AP in the AP MLD 2 is on the same link as the AP 1x.

In a multiple BSSID set, only an AP whose BSSID is a transmitted BSSID can send a beacon frame and a probe response frame, whereas an AP with a non-transmitted BSSID does not send a beacon frame. Therefore, if all APs in an AP MLD (for example, the AP MLD 3 in FIG. 5) are non-transmitted APs, and because a TIM element is carried in a beacon frame, the AP MLD cannot indicate whether a non-AP MLD associated with the AP MLD has a downlink individually addressed traffic. In addition, for another example, in the AP MLD 1 in FIG. 5, the AP 2y working on the link 2 is a non-transmitted AP. A non-AP MLD working on the link 2 cannot obtain a downlink individually addressed traffic notification sent to the non-AP MLD by the AP MLD 1 associated with the non-AP MLD.

Therefore, embodiments of this application provide an individually addressed traffic indication method applicable to multiple links. A downlink individually addressed traffic indication of an AP MLD to which a non-transmitted AP belongs is carried in signaling sent by a reporting AP, and this can help the AP MLD to which the non-transmitted AP belongs indicate whether a non-AP MLD associated with the AP MLD has a downlink individually addressed traffic. The technical solutions provided in this application are described in detail below with reference to more accompanying drawings.

One or more APs in an AP MLD all need to send buffer unit (buffer unit, BU) indication information to non-AP MLDs associated with the one or more APs, and one bit of the BU indication information corresponds to an AID of one non-AP MLD. If a bit of the BU indication information is set to "1", it indicates that the AP MLD has a downlink individually addressed traffic for the non-AP MLD identified by the AID corresponding to the bit; or if a bit of the BU indication information is set to "0", it indicates that the AP MLD has no downlink individually addressed traffic for the non-AP MLD identified by the AID corresponding to the bit.

Multi-link association establishment:

In a process of establishing a multi-link association, a station of a station MLD and an AP of an AP MLD interact through an association request frame or an association response frame to establish a multi-link association, to be specific, each of multiple stations of the station MLD establishes an association with each of multiple APs of the AP MLD. In an association response frame sent by an AP of an AP MLD, one AID is allocated to each station MLD, in other words, multiple stations of the station MLD have a same AID. The AP MLD and the station MLD each have a unique MLD MAC address. The MLD MAC address is an index used at an upper layer of MAC, such as an IP data source and destination. In other words, data packets sent by each AP of the AP MLD to the same station MLD are shared.

Embodiment 1

Figure 6:
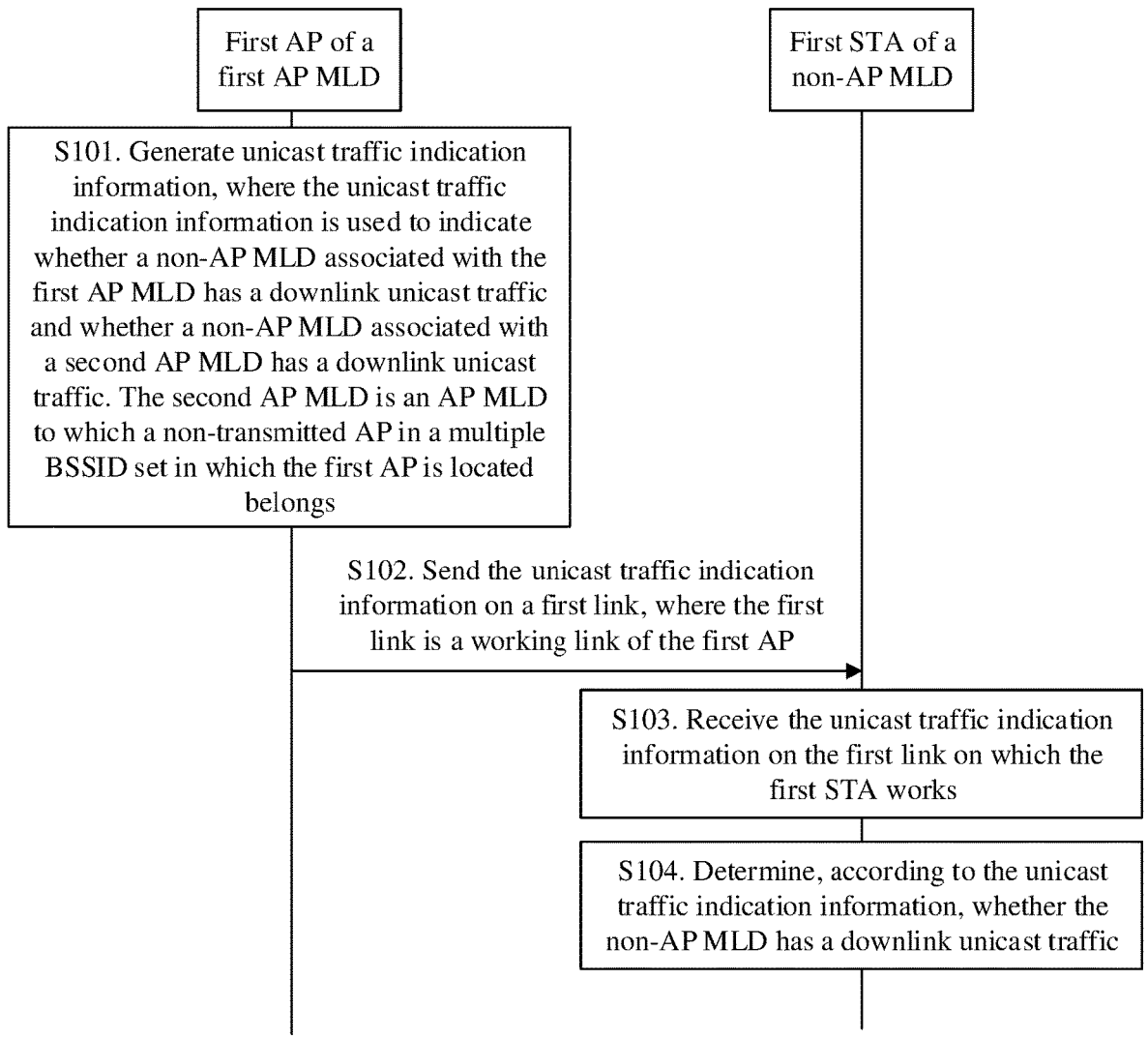
FIG. 6 is a schematic flowchart of an individually addressed traffic indication method applicable to multiple links according to an embodiment of this application.

FIG. 6 is a schematic flowchart of an individually addressed traffic indication method applicable to multiple links according to an embodiment of this application. The individually addressed traffic indication method applicable to multiple links is described by using an example in which the method is implemented in a communications system including an AP MLD and a non-AP MLD. The AP MLD includes one or more APs, and a first AP is any reporting AP of the AP MLD. Optionally, the reporting AP is not a non-transmitted AP in a multiple BSSID set. The non-AP MLD includes one or more STAs, and a first STA is any STA of the non-AP MLD. As described above, a multi-link association may be established between the AP MLD and the non-AP MLD, and both the first AP and the first STA work on the first link. As shown in FIG. 6, the individually addressed traffic indication method applicable to multiple links includes but is not limited to the following steps.

S101: The first AP of a first AP MLD generates individually addressed traffic indication information, where the individually addressed traffic indication information is used to indicate whether a non-AP MLD associated with the first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which the first AP is located belongs.

The individually addressed traffic indication information may be referred to as an individually addressed traffic indication field, or an individually addressed traffic indication, or a buffer unit (buffer unit, BU) indication. This is not limited in this embodiment of this application. The individually addressed traffic indication information may be carried in a TIM element, for example, the TIM element field shown in FIG. 2, and the individually addressed traffic indication information is carried in a partial virtual bitmap field.

Specifically, the first AP is a reporting AP in the multiple BSSID set, and the first AP belongs to the first AP MLD. Therefore, the first AP of the first AP MLD may generate individually addressed traffic indication information, and the individually addressed traffic indication information may include two parts of indication information. One part of indication information is individually addressed traffic indication information of the first AP MLD, and is used to indicate whether the non-AP MLD associated with the first AP MLD has a downlink individually addressed traffic; the other part of indication information is individually addressed traffic indication information of the AP MLD (namely, the second AP MLD) to which a non-transmitted AP in a multiple BSSID set in which the first AP is located belongs, and is used to indicate whether a non-AP MLD associated with the second AP MLD on the first link on which the first AP works has a downlink individually addressed traffic. In other words, the individually addressed traffic indication information carries not only the individually addressed traffic indication of the reporting AP (the first AP), but also an individually addressed traffic indication of an AP MLD to which other non-transmitted APs in the multiple BSSID set in which the reporting AP is located belong. It may be understood that the individually addressed traffic indication information mentioned in this application includes two parts of indication information, and this does not mean that the two parts of indication information are in different fields, and the two parts of indication information may be in the same field.

Optionally, there are the following two possibilities for the non-AP MLD associated with the MLD in which the reporting AP is located: 1) all non-AP MLDs that establish multi-link associations with the MLD in which the reporting AP is located, where the non-AP MLD may establish associations with some or all of APs of the MLD in which the reporting AP is located; or 2) a non-AP MLD associated with the reporting AP in the MLD in which the reporting AP is located, where the non-AP MLD may establish associations with some or all of APs of the MLD in which the reporting AP is located, provided that the some or all of the APs need to include the reporting AP.

Optionally, there are also the following two possibilities for the non-AP MLD associated with the AP MLD to which the non-transmitted AP in the multiple BSSID set in which the reporting AP is located belongs: 1) The non-AP MLD may indicate all non-AP MLDs that establish multi-link associations with the AP MLD to which the non-transmitted AP belongs, where the non-AP MLDs may establish associations with some or all of APs of the AP MLD to which the non-transmitted AP belongs; or 2) the non-AP MLD may indicate a non-AP MLD associated with the non-transmitted AP of the AP MLD to which the non-transmitted AP belongs, where the non-AP MLD may establish associations with some or all of APs of the AP MLD to which the non-transmitted AP belongs, provided that the some or all of the APs need to include the non-transmitted AP.

For example, in FIG. 5, the AP 1x whose MAC address identifier is BSSID_1x is used as the reporting AP, in other words, the first AP is the AP 1x. Then, the AP MLD 1 in FIG. 5 is the first AP MLD, and a link on which the AP 1x works is the link 1. The individually addressed traffic indication information generated by the AP 1x includes the individually addressed traffic indication, for the non-AP MLD associated with the MLD in which the AP 1x is located, of the AP 1x, and there are the following two possibilities: 1) The individually addressed traffic indication information may indicate whether all non-AP MLDs establishing multi-link associations with the AP MLD 1 have downlink individually addressed traffics, where the non-AP MLDs may establish associations with some or all of APs of the AP MLD 1; or 2) the individually addressed traffic indication information may indicate whether a non-AP MLD associated with the AP 1x of the AP MLD 1 has a downlink individually addressed traffic, where the non-AP MLD may establish associations with some or all of APs of the AP MLD 1, provided that the some or all of the APs need to include the AP 1x.

The individually addressed traffic indication information generated by the AP 1x further includes an individually addressed traffic indication, for a non-AP MLD associated with the AP MLD 3, of the AP MLD 3 to which the non-transmitted AP (namely, the AP 1y) in the multiple BSSID set 1 in which the AP 1x is located belongs, and there are also the following two possibilities: 1) The individually addressed traffic indication information may indicate whether all non-AP MLDs associated with the AP MLD 3 have downlink individually addressed traffics; or 2) the individually addressed traffic indication information may indicate whether a non-AP MLD associated with the AP 1y, of the AP MLD 3, in the same multiple BSSID set as the AP 1x has a downlink individually addressed traffic. For example, a non-AP MLD 1 is associated with the AP 1y of the AP MLD 3 on the link 1 and the AP 2z of the AP MLD 3 on the link 2, a non-AP MLD 2 is associated with the AP 1y of the AP MLD 3 on the link 1, the AP 2z of the AP MLD 3 on the link 2, and the AP 4y of the AP MLD 3 on a link 4, and a non-AP MLD 3 is associated with the AP 2z of the AP MLD 3 on the link 2 and the AP 4y of the AP MLD 3 on the link 4. In a first implementation, the individually addressed traffic indication of the AP MLD 3 for the non-AP MLD associated with the AP MLD 3 includes indicating whether the non-AP MLD 1, the non-AP MLD 2, and the non-AP MLD 3 have downlink individually addressed traffics. In a second implementation, the individually addressed traffic indication of the AP MLD 3 for the non-AP MLD associated with the AP MLD 3 includes indicating whether the non-AP MLD 1 and the non-AP MLD 2 have downlink individually addressed traffics.

For another example, the AP 2x whose MAC address identifier is BSSID_2x is used as the reporting AP, in other words, the first AP is the AP 2x. Then, the AP MLD 2 in FIG. 5 is the first AP MLD, and a link on which the AP 2x works is the link 2. The individually addressed traffic indication information generated by the AP 2x includes not only the individually addressed traffic indication, for the non-AP MLD associated with the MLD in which the AP 2x is located, of the AP 2x, but also an individually addressed traffic indication, for a non-AP MLD associated with the AP MLD 1 to which the AP 2y belongs, of the AP MLD 1, and an individually addressed traffic indication, for a non-AP MLD associated with the AP MLD 3 to which the AP 2z belongs, of the AP MLD 3.

In an optional embodiment, the reporting AP herein may not be limited to an AP of an AP MLD, to be specific, the reporting AP herein may be a single-link device. The individually addressed traffic indication information generated by the reporting AP carries an individually addressed traffic indication, for a station associated with the reporting AP, of the reporting AP, which is used to indicate whether the STA associated with the reporting AP has a downlink individually addressed traffic; and may further carry an individually addressed traffic indication of an AP MLD to which other non-transmitted APs in the multiple BSSID set of the current link belong, which is used to indicate whether the AP MLD has a downlink individually addressed traffic for a non-AP MLD associated with the AP MLD.

S102: The first AP of the first AP MLD sends the individually addressed traffic indication information on a first link, where the first link is a working link of the first AP.

In this embodiment of this application, the individually addressed traffic indication information may be carried in a management frame, such as a beacon frame or a TIM frame; or the individually addressed traffic indication information may be alternatively carried in another frame such as a data frame or a control frame.

S103: The first STA of the non-AP MLD receives the individually addressed traffic indication information on the first link on which the first STA works.

The first STA may be a station managed by the first AP or a surrounding station of the first AP. The surrounding station of the first AP includes a station managed by the first AP and an unassociated station. The following describes the individually addressed traffic indication method described in this embodiment of this application by using the station managed by the AP as an example. Optionally, the first STA may be any station of the non-AP MLD, and may learn whether the non-AP MLD to which the first STA belongs has a downlink individually addressed traffic. Optionally, both the first STA and the first AP work on the first link.

S104: The first STA of the non-AP MLD determines, according to the individually addressed traffic indication information, whether the non-AP MLD has a downlink individually addressed traffic.

Specifically, the first STA of the non-AP MLD may parse the received individually addressed traffic indication information, to determine whether the non-AP MLD has a downlink individually addressed traffic. If the individually addressed traffic indication information indicates that the non-AP MLD has a downlink individually addressed traffic to be received, a station of the non-AP MLD may wake up from a doze state, change to an active state, and send a PS-Poll (power save poll) frame to an AP associated with the station to notify an AP MLD in which the AP is located that the station has been in an awake state and can start to receive a downlink individually addressed traffic. After receiving the PS-Poll frame, the AP can respond with an acknowledgment frame, and then send a downlink individually addressed traffic to the STA; or directly send a downlink individually addressed traffic to the STA after receiving the PS-Poll frame. If the individually addressed traffic indication information indicates that the non-AP MLD has no downlink individually addressed traffic, the station of the non-AP MLD can continue to doze, or change from an active state to a doze state.

It may be understood that, in an 802.11 protocol, a STA usually has two working modes: one is a non-power save mode, and the other is a power save mode. When the STA operates in the non-power-saving mode, the STA is in an active state (active state, which may also be referred to as an awake state) regardless of whether there is to-be-transmitted data on the STA. When the STA operates in the power-saving mode, the STA may be in an active state (active state) when transmitting data with an AP. When there is no data transmission between the STA and the AP, the STA may be in a doze state (doze state) to reduce power consumption. The STA may send a frame to the AP to notify whether the STA is in the power-saving mode, where a power-saving bit of 1 in a frame control field (frame control field) in a MAC header in the frame is used to notify that the STA is in the power-saving mode, while a power-saving bit of 0 in the frame control field (frame control field) in the MAC header in the frame is used to notify that the STA is in the non-power-saving mode. Corresponding to the non-AP MLD (or the station MLD), a power save bit is set for each station of the non-AP MLD.

It can be learned that, in this embodiment of this application, the individually addressed traffic indication information sent by the first AP (namely, the reporting AP) of the AP MLD not only can indicate whether the non-AP MLD associated with the first AP MLD has a downlink individually addressed traffic, but also can help the second AP MLD indicate whether the non-AP MLD associated with the second AP MLD has a downlink individually addressed traffic, and the second AP MLD is an AP MLD to which a non-transmitted AP in the multiple BSSID set in which the first AP is located belongs. This can resolve a problem that some APs or all APs of AP MLDs cannot indicate whether non-AP MLDs associated with the AP MLDs have downlink individually addressed traffics (it should be noted that a non-transmitted AP in the multiple BSSID set cannot transmit a beacon frame or a probe response frame, resulting in failure to send a downlink individually addressed traffic indication), so that the non-AP MLDs associated with the APs can normally receive downlink individually addressed traffics. Because there is a possibility that all APs of an AP MLD in 802.11be are non-transmitted APs, the solution provided in this embodiment of this application can resolve a problem that AP MLDs whose APs are all non-transmitted APs cannot send individually addressed traffic indications, thereby improving integrity and diversity of downlink individually addressed traffic indications.

In an optional embodiment, before step S101 in FIG. 6, the method may further include the following steps: S105: The first AP of the first AP MLD generates AID allocation information, where the AID allocation information carries an AID allocated to the non-AP MLD, and the AID is different from an AID of the non-AP MLD associated with the second AP MLD. S106: The first AP of the first AP MLD sends the AID allocation information. Correspondingly, the first STA of the non-AP MLD receives the AID allocation information. S107: The first STA of the non-AP MLD parses the received AID allocation information, to learn that the AID allocation information carries the AID allocated to the non-AP MLD. The AID allocation information may be carried in an association response frame. An AID space (or a set of to-be-allocated AIDs) used by the first AP MLD to allocate an AID to the non-AP MLD associated with the first AP MLD and an AID space (or a set of to-be-allocated AIDs) used by the second AP MLD to allocate an AID to the non-AP MLD associated with the second AP MLD are the same. Optionally, the AP MLD to which the non-transmitted AP in the multiple BSSID set in which the first AP is located belongs includes one or more AP MLDs.

Optionally, before step S105, the method further includes: the first STA of the non-AP MLD sends an association request frame to the first AP of the first AP MLD, where the association request frame is used to request to establish a multi-link association with the first AP MLD. Correspondingly, the first AP of the first AP MLD receives the association request frame.

Optionally, steps S105 and S106 may be alternatively performed by a second AP of the first AP MLD, and step S107 may be alternatively performed by a second STA of the non-AP MLD. Specifically, the second AP of the first AP MLD generates AID allocation information, where the AID allocation information carries the AID allocated to the non-AP MLD, and the AID is different from the AID of the non-AP MLD associated with the second AP MLD; and the second AP of the first AP MLD sends the AID allocation information. Correspondingly, the second STA of the non-AP MLD receives the AID allocation information. The second STA of the non-AP MLD parses the received AID allocation information, to learn that the AID allocation information carries the AID allocated to the non-AP MLD. The second AP is any AP of the first AP MLD, and the second STA is any STA of the non-AP MLD.

It can be learned that when the AID is allocated, the AID of the non-AP MLD associated with the first AP MLD is different from the AID of the non-AP MLD associated with the second AP MLD, so that an AID ambiguity can be avoided when the individually addressed traffic of the non-AP MLD is indicated.

The foregoing content describes the individually addressed traffic indication method applicable to multiple links provided in this embodiment of this application. A specific implementation of the foregoing individually addressed traffic indication information is described below with reference to the individually addressed traffic indication method shown in FIG. 6.

(a) In a first implementation, one bit of the individually addressed traffic indication information corresponds to one non-AP MLD. A value of each bit is used to indicate whether a non-AP MLD corresponding to the bit has a downlink individually addressed traffic; in other words, each bit indicates whether the non-AP MLD corresponding to the bit has a downlink individually addressed traffic. The non-AP MLD herein is the non-AP MLD associated with the first AP MLD and the non-AP MLD associated with the second AP MLD.

Figure 7:
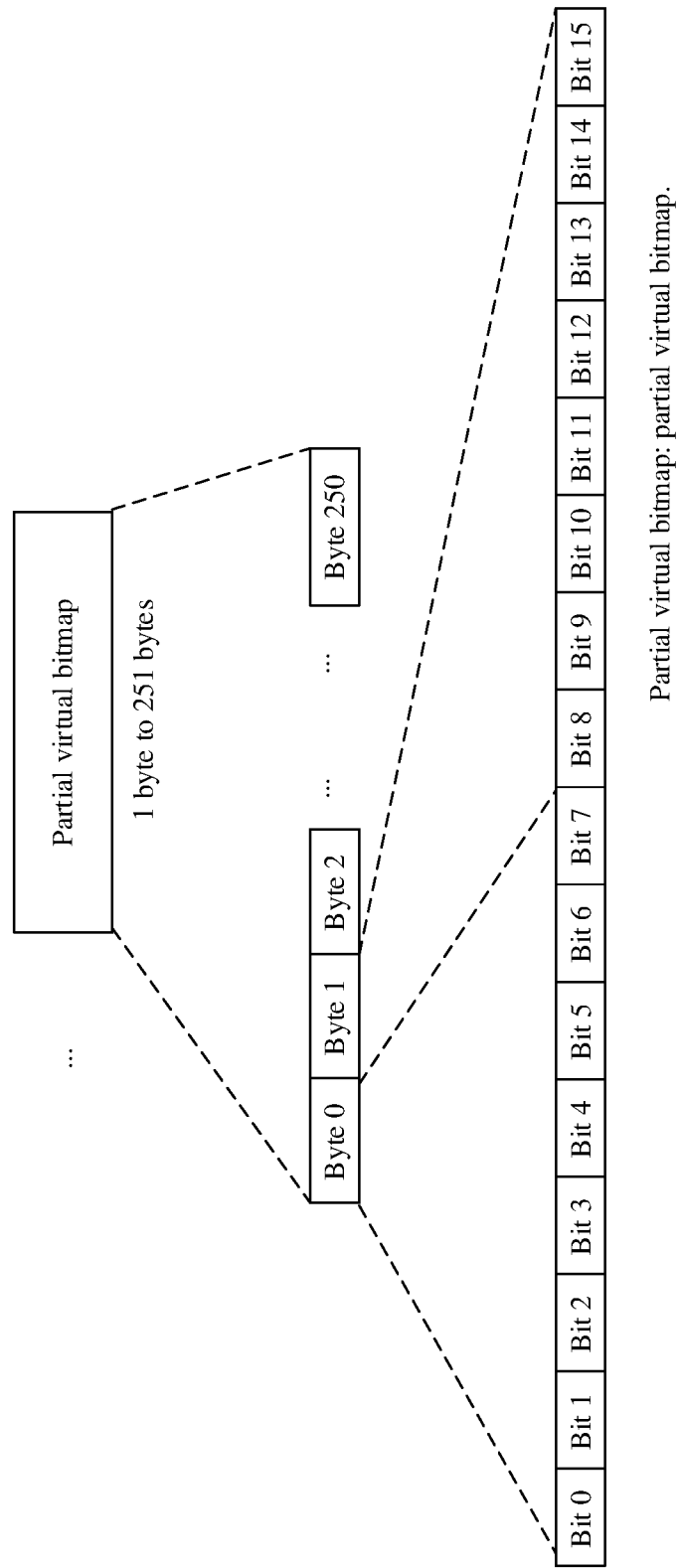
FIG. 7 is a schematic diagram of a partial virtual bitmap field according to an embodiment of this application.

(b) In a second implementation, the individually addressed traffic indication information is carried in a partial virtual bitmap field of a TIM element. FIG. 7 is a schematic diagram of a partial virtual bitmap field according to an embodiment of this application. FIG. 7 shows each bit of the partial virtual bitmap field in FIG. 2. For example, the partial virtual bitmap field is of 251 bytes, each byte includes eight bits. As shown in FIG. 7, a byte 0 includes bits 0 to 7, a byte 1 includes bits 8 to 15, . . . , and so on, and a byte 250 includes bits 2000 to 2007. Each bit of the individually addressed traffic indication information corresponds to an AID of one non-AP MLD, and each bit of the individually addressed traffic indication information is used to indicate whether a non-AP MLD identified by an AID corresponding to the bit has a downlink individually addressed traffic. It may be understood that the non-AP MLD herein is the non-AP MLD associated with the first AP MLD and the non-AP MLD associated with the second AP MLD. Because each bit of the partial virtual bitmap field of the TIM element corresponds to one AID, an AID needs to be further allocated to a non-AP MLD. In addition, an AID space (or a set of to-be-allocated AIDs) used by the first AP MLD to allocate an AID to the non-AP MLD associated with the first AP MLD and an AID space (or a set of to-be-allocated AIDs) used by the second AP MLD to allocate an AID to the non-AP MLD associated with the second AP MLD are the same. Therefore, association identifiers AIDs corresponding to bits of the individually addressed traffic indication information need to be unique, in other words, need to be different from each other.

Correspondingly, steps S101 to S104 in FIG. 6 may be as follows: the first AP of the first AP MLD generates a TIM element, where the TIM element includes individually addressed traffic indication information, the individually addressed traffic indication information is used to indicate whether a non-AP MLD associated with the first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which the first AP is located belongs; the first AP of the first AP MLD sends the TIM element on the first link, where the first link is the working link of the first AP; the first STA of the non-AP MLD receives the TIM element on the first link on which the first STA works; and the first STA of the non-AP MLD determines, based on the TIM element, whether the non-AP MLD has a downlink individually addressed traffic.

The TIM element may be carried in a beacon frame, or may be carried in another management frame, such as a TIM frame.

Optionally, the beacon frame carrying the TIM element may further include a special field, where for each non-AP MLD that has a downlink individually addressed traffic to be received (whether there is a downlink individually addressed traffic is indicated by the TIM element), there is a corresponding special field. The special field may be a multi-link identification bitmap field or multiple link identification information fields, and the multi-link identification bitmap field or the multiple link identification information fields are used to indicate one or more links for receiving downlink individually addressed traffics. One bit of the multi-link identification bitmap field may correspond to one link. When a value of one or more bits is a first value such as 1, it indicates that there are downlink individually addressed traffics on one or more links corresponding to the one or more bits; when a value of one or more bits is a second value such as 0, it indicates that there is no downlink individually addressed traffic on one or more links corresponding to the one or more bits. The multiple link identification information fields carry identification information for distinguishing different links. It may be understood that, in the TIM element, one bit is still used to indicate whether one non-AP MLD has a downlink individually addressed traffic.

Optionally, the special field may be alternatively a traffic identifier (traffic identifier, TID) bitmap field, where the TID bitmap field is used to indicate that the received downlink individually addressed traffic corresponds to one or more TIDs. Then, based on TID to Link mapping (traffic identifier to link mapping) negotiated between the non-AP MLD and the AP MLD, the non-AP MLD knows a station, working on a specific link, that is used to receive a downlink individually addressed traffic notification.

It can be learned that in this implementation, some bits of the partial virtual bitmap field of the beacon frame are used to indicate whether a non-AP MLD associated with an MLD in which the reporting AP is located has a downlink individually addressed traffic and whether a non-AP MLD associated with the second AP MLD has a downlink individually addressed traffic. Without a need to change a frame format of the TIM element, one AP MLD can help another AP MLD indicate whether a non-AP MLD associated with the another AP MLD has a downlink individually addressed traffic. This can improve flexibility of notifying the downlink individually addressed traffic.

(c) Because one bit of the partial virtual bitmap field of the TIM element may indicate whether one non-AP MLD has a downlink individually addressed traffic, if in the same collocated AP MLD set, some non-AP MLDs associated with different AP MLDs have the same AID, after receiving beacon frames, these non-AP MLDs cannot determine a specific STA or a specific non-AP MLD to which downlink individually addressed traffic indications and/or link bitmap indications/TID bitmap indications carried in the beacon frames belong. For example, in FIG. 5, if the reporting AP is the AP 1x, and it is assumed that the non-AP MLD 1 is associated with the AP 1x and the AP 2y of the AP MLD 1 in which the AP 1x is located, and the link on which the AP 1x works is the link 1, a non-transmitted AP on the link 1 is the AP 1y. When a non-AP MLD 2 is associated with the AP 1y, the AP 2z, and the AP 4y in an AP MLD 3 in which the AP 1y is located, and an AID of the non-AP MLD 1 is the same as an AID of the non-AP MLD 2, if a downlink individually addressed traffic indication for the non-AP MLD in the TIM element sent by the AP 1x is 1, it can only indicate that at least one non-AP MLD in the non-AP MLD 1 and the non-AP MLD 2 has a downlink individually addressed traffic, and a non-AP MLD that has a downlink individually addressed traffic cannot be known.

Figure 8:
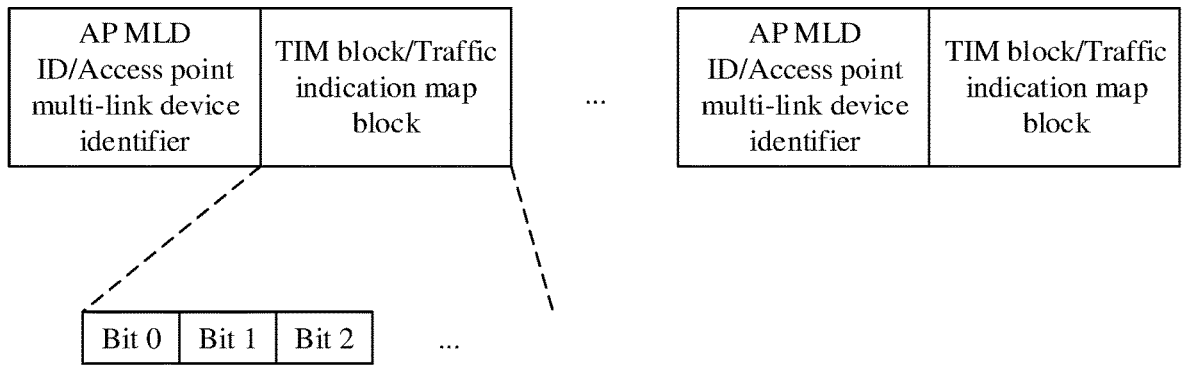
FIG. 8 is a schematic diagram of a partial frame format of a new element according to an embodiment of this application.

Therefore, in a third implementation, indication for the individually addressed traffic indication information is performed based on an AP MLD. Specifically, the second AP MLD collocated with the reporting AP corresponds to a separate TIM block, such as a partial virtual bitmap field, and the TIM block may constitute a new element. The new element may carry the individually addressed traffic indication information. The new element includes at least a TIM block corresponding to one second AP MLD (the TIM block is used to indicate whether the non-AP MLD associated with the second AP MLD has a downlink individually addressed traffic). FIG. 8 is a schematic diagram of a partial frame format of a new element according to an embodiment of this application. As shown in FIG. 8, an (ID) such as an MLD ID or an MLD MAC address, is used to indicate that the TIM block is used to indicate whether a specific AP MLD has a downlink individually addressed traffic for a non-AP MLD associated with the AP MLD. In each TIM block, one bit may still be used to indicate whether one non-AP MLD has a downlink individually addressed traffic. Each bit of the TIM block may correspond to one AID, and therefore, an AID needs to be further allocated to each non-AP MLD.

In another implementation, a separate TIM block corresponding to the second AP MLD may be alternatively a TIM element, and a structure of the TIM element is consistent with that of the existing TIM element. In this case, the TIM element does not include an identifier of the second AP MLD. The TIM element of the second AP MLD may be located in a non-transmitted profile corresponding to a non-transmitted BSSID in a multiple BSSID element in a frame body of a management frame, where an AP corresponding to the non-transmitted BSSID belongs to the second AP MLD, and the AP corresponding to the non-transmitted BSSID and the reporting AP mentioned in the foregoing paragraph are in a same multiple BSSID set.

Herein, for the third implementation, AIDs of all non-AP MLDs associated with the same AP MLD need to be unique, in other words, need to be different from each other, thereby avoiding an AID ambiguity. It may be understood that, herein, identifiers of one or more AP MLDs in the new element sent by the reporting AP need to be unique, in other words, need to be different from each other. Alternatively, herein, identifiers of all AP MLDs in the collocated AP MLD set of the reporting AP also need to be unique, in other words, need to be different from each other. In other words, the AID space used by the first AP MLD to allocate the AID to the non-AP MLD associated with the first AP MLD and the AID space used by the second AP MLD to allocate the AID to the non-AP MLD associated with the second AP MLD are independent of each other. To be specific, an AID allocated by the first AP MLD to a non-AP MLD associated with the first AP MLD may be the same as the AID allocated by the second AP MLD to the non-AP MLD associated with the second AP MLD. For example, in FIG. 5, if the AP 1x is the reporting AP, the AP MLD 1 is the first AP MLD. It is assumed that the non-AP MLD 1 is associated with the AP MLD 1 and the non-AP MLD 2 is associated with the AP MLD 3 (one of second AP MLDs). Then, an AID allocated by the AP MLD 1 to the non-AP MLD 1 may be the same as an AID allocated by the AP MLD 3 to the non-AP MLD 2. It may be understood that the "AID space" mentioned in this application may be a set of to-be-allocated AIDs.

Optionally, each TIM block may alternatively carry a link bitmap indication or a TID bitmap indication. To be specific, each TIM block may include a special field, and the special field may be a multi-link identification bitmap field or multiple link identification information fields, or may be a TID bitmap field.

Optionally, the new element may be carried in a beacon frame, or may be carried in another management frame, such as a TIM frame.

It can be learned that in TIM indication in this implementation, an ambiguity of AIDs of non-AP MLDs associated with different AP MLDs can be avoided by distinguishing traffics of different AP MLDs and using IDs of AP MLDs as indexes of TIM blocks.

To indicate whether the non-AP MLD associated with the first AP (namely, the reporting AP) has a downlink individually addressed traffic and whether the non-AP MLD associated with the second AP MLD has a downlink individually addressed traffic, the first AP of the first AP MLD further needs to allocate an AID to each non-AP MLD before generating the individually addressed traffic indication information.

Embodiment 2

Embodiment 2 of this application describes a method for allocating an AID to a multi-link device, and the method is specifically a method for allocating an AID to a non-AP MLD.

It may be understood that, the AID is an identifier (identify, ID) allocated by an AP to an associated STA after the association is established, and may be considered as an ID of the associated STA. The AID may be used to identify and distinguish STAs associated with the AP, and may be used as an index in a partial frame structure to point to a specific associated STA. If the AP can support multiple BSSIDs, or a beacon frame or a probe response frame can carry a multiple BSSID element (multiple BSSID element), a maximum quantity of BSSIDs that the AP can support is $2^n$, indicating that a range of a quantity of BSSIDs is [1, $2^n-1$], and a range of an AID that the AP can allocate to the STA is [$2^n$, 2007]. Herein, n may be a value of a MaxBSSID indicator (MaxBSSID indicator) field in the BSSID element. If the AP cannot support multiple BSSIDs, or the beacon frame or the probe response frame cannot carry the multiple BSSID element, the range of the AID that the AP can allocate to the STA is [1, 2007].

In a small area, there may be multiple types of users or users supporting multiple types of services. If different APs are used in this small area, because each AP tries to find a channel with no interference or relatively weak interference, channel interference between different APs cannot be avoided. In view of this, IEEE 802.11ax is provided to obtain, through virtualization, multiple APs by using one AP, so as to be used for different traffic types or customer types. Therefore, one virtual AP may have one BSSID, in other words, one actual AP has multiple BSSIDs. In other words, some APs can support multiple BSSIDs.

It may be further understood that multiple STAs included in one non-AP MLD may share the same AID, in other words, one non-AP MLD has only one AID.

It may be understood that, in practical applications, Embodiment 2 of this application may be implemented separately, or may be implemented in combination with Embodiment 1. This is not limited in this application. Specifically, Embodiment 2 of this application may be implemented in combination with the second implementation of the individually addressed traffic indication information in Embodiment 1.

It may be understood that, like the collocated AP MLD set of the foregoing reporting AP, a collocated AP MLD set of any AP (for ease of description, an $AP_i$ is used as an example) includes the following APs:

(1) all APs that belong to the same AP MLD as the $AP_i$, or all APs in the AP MLD in which the $AP_i$ is located;

(2) all APs in an AP MLD in which a non-transmitted AP in the same multiple BSSID set as the $AP_i$ is located; or all APs in an AP MLD in which a non-transmitted AP in a multiple BSSID set in which the $AP_i$ is located is located; and (3) all APs in an AP MLD that meets the following two conditions: 1) at least one AP of the AP MLD is in the same multiple BSSID as an AP in the AP MLD in which the $AP_i$ is located; and 2) there is no AP in the AP MLD working on the same link as the $AP_i$.

Figure 9:
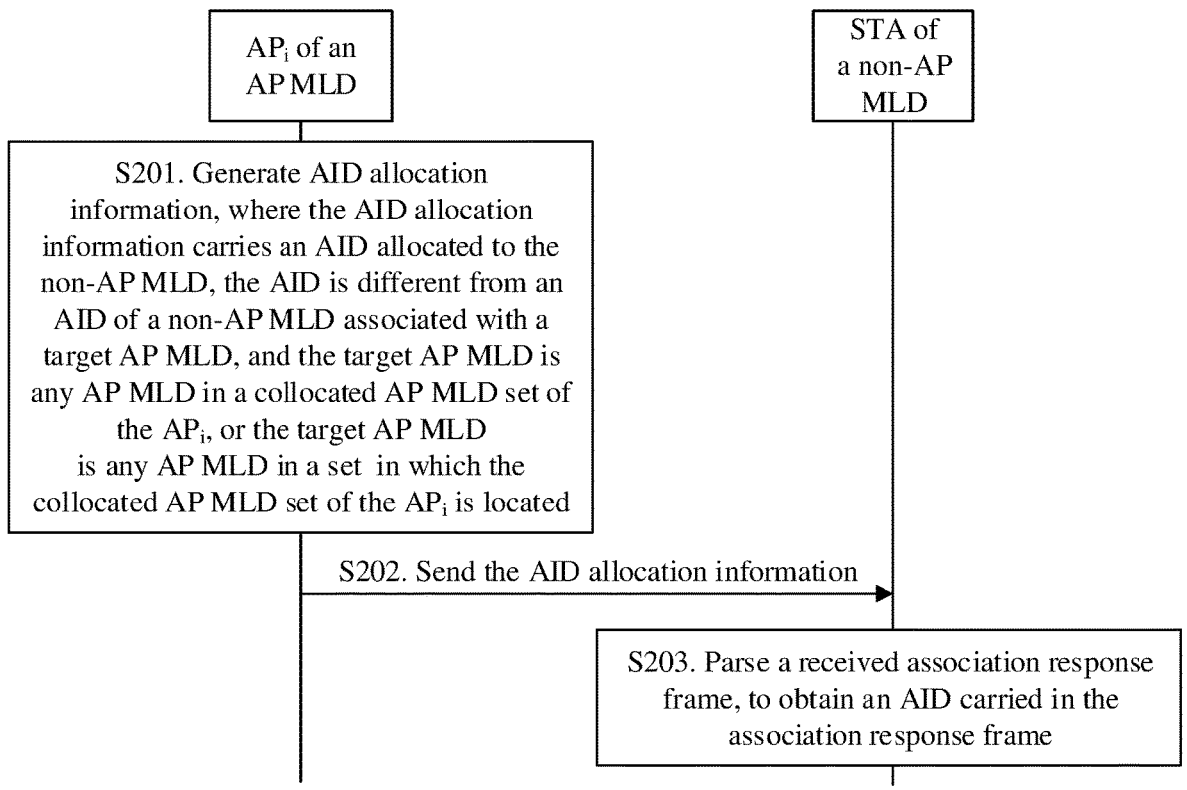
FIG. 9 is a schematic flowchart of a method for allocating an AID to a non-AP MLD according to an embodiment of this application.

FIG. 9 is a schematic flowchart of a method for allocating an AID to a non-AP MLD according to an embodiment of this application. As shown in FIG. 9, the method for allocating an AID includes but is not limited to the following steps.

S201: An $AP_i$ of an AP MLD generates AID allocation information, where the AID allocation information carries an AID allocated to the non-AP MLD, the AID is different from an AID of a non-AP MLD associated with a target AP MLD, and the target AP MLD is any AP MLD in a collocated AP MLD set (collocated AP MLD set) of the $AP_i$, or the target AP MLD is any AP MLD in a set group in which the collocated AP MLD set of the $AP_i$ is located.

S202: The $AP_i$ of the AP MLD sends the AID allocation information to a STA of the non-AP MLD. Correspondingly, the STA of the non-AP MLD receives the AID allocation information.

The AP MLD in this embodiment of this application may be a first AP MLD or a second AP MLD in Embodiment 1 or another AP MLD. The $AP_i$ is any AP of the AP MLD.

Implementation A: The target AP MLD is any AP MLD in the collocated AP MLD set of the $AP_i$.

In the "collocated AP MLD set of $AP_i$" mentioned in this embodiment of this application, all AP MLDs (APs included in the AP MLDs) are collocated with the $AP_i$. Both the AP MLD and the target AP MLD belong to the collocated AP MLD set of the $AP_i$.

Specifically, the AID allocation information may carry the AID allocated to the non-AP MLD, the AID is different from the AID of the non-AP MLD associated with the target AP MLD, and the target AP MLD is any AP MLD in the collocated AP MLD set (collocated AP MLD set) of the $AP_i$. In other words, an AID space or a set of to-be-allocated AIDs used by the AP MLD to allocate an AID to the non-AP MLD associated with the AP MLD and an AID space or a set of to-be-allocated AIDs used by the target AP MLD to allocate an AID to the non-AP MLD associated with the target AP MLD are the same. It may be understood that, the AID allocated to the non-AP MLD is also different from an AID of a non-AP MLD associated with the AP MLD.

Optionally, the non-AP MLD associated with the AP MLD in this embodiment of this application may be understood in the following two manners: 1) all non-AP MLDs establishing multi-link associations with the AP MLD, where the non-AP MLD may establish associations with some or all of APs of the AP MLD; and 2) a non-AP MLD associated with the $AP_i$ of the AP MLD, where the non-AP MLD may establish associations with some or all of APs of the AP MLD, provided that the some or all of the APs need to include the $AP_i$. Herein, the $AP_i$ is an AP, in the AP MLD, to which an AID is allocated.

Figure 10A:
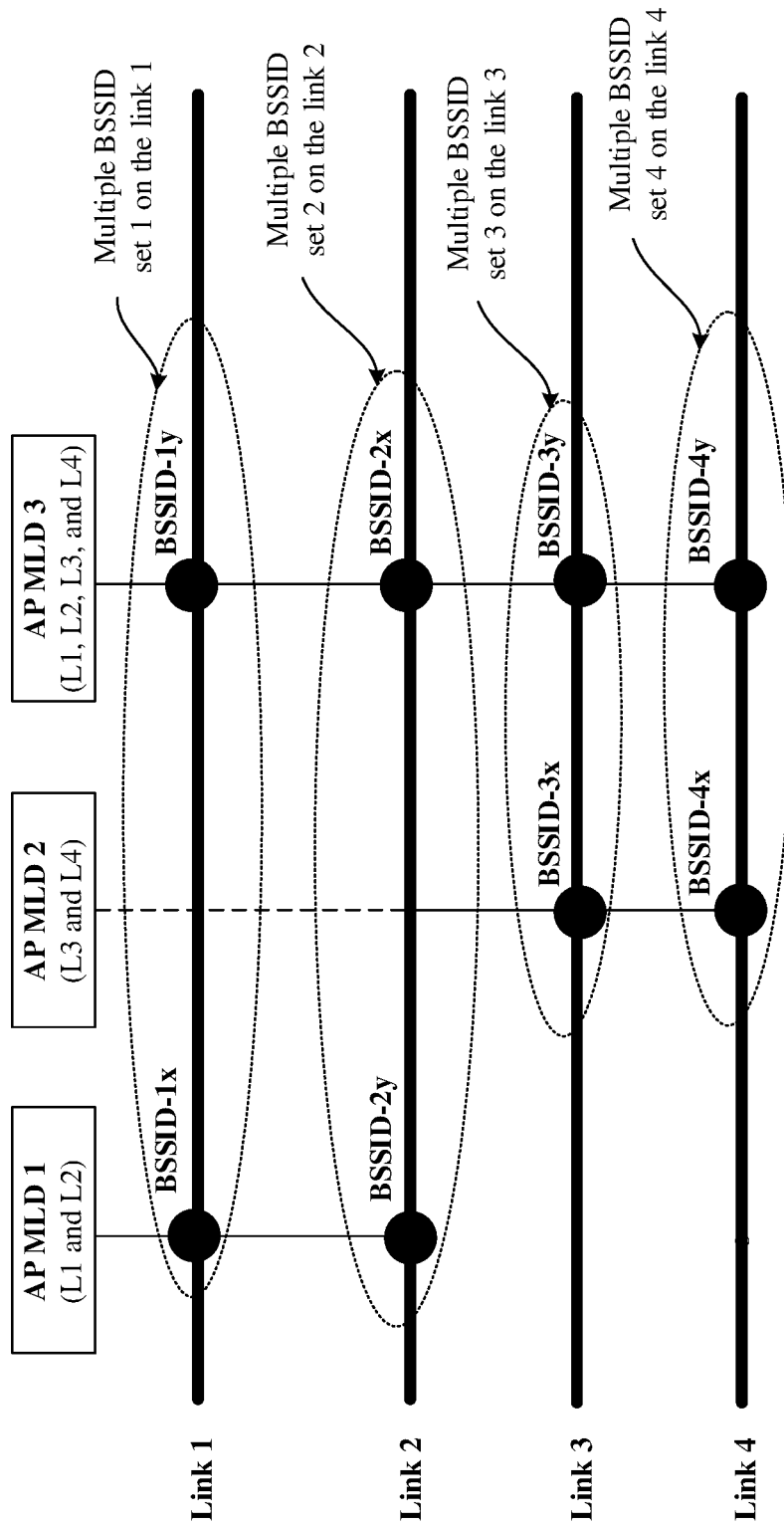
FIG. 10a is a schematic diagram of a collocated AP MLD set of an AP according to an embodiment of this application.

FIG. 10a is a schematic diagram of a collocated AP MLD set of an AP according to an embodiment of this application. As shown in FIG. 10a, it is assumed that the $AP_i$ is the AP 1x. Then, a set of APs collocated with the AP 1x includes: the AP 2y, the AP 1y, the AP 2x, the AP 3y, and the AP 4y. Therefore, the collocated AP MLD set of the AP 1x includes: the AP MLD 1 and the AP MLD 3. Therefore, the AID that is carried in the AID allocation information and that is allocated to the non-AP MLD is different from the AID of the non-AP MLD associated with the AP MLD 1, and is also different from an AID of a non-AP MLD associated with the AP MLD 3. In other words, the AID of the non-AP MLD associated with the AP MLD 1 and the AID of the non-AP MLD associated with the AP MLD 3 need to be unique, in other words, need to be different from each other.

Figure 10B:
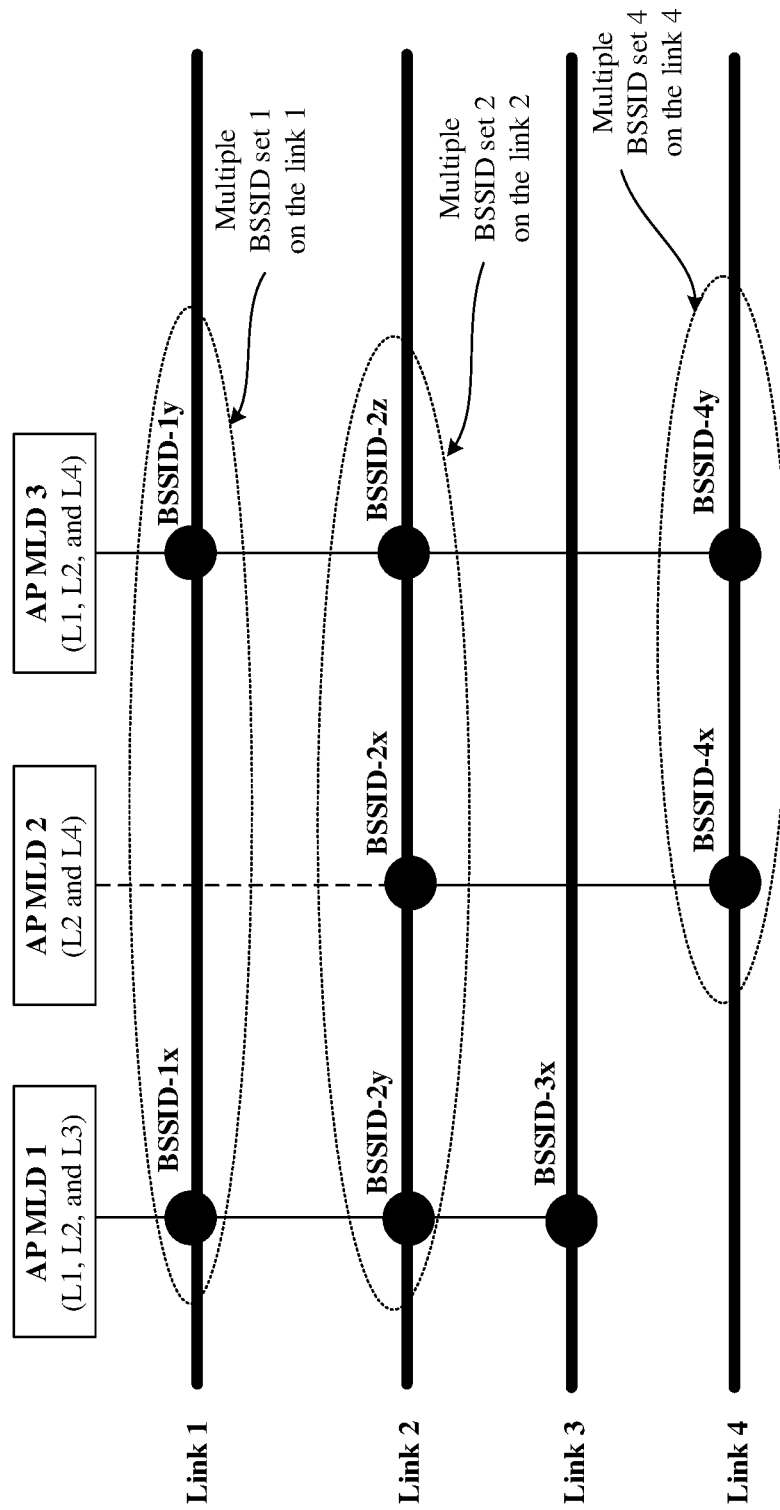
FIG. 10b is another schematic diagram of a collocated AP MLD set of an AP according to an embodiment of this application.

FIG. 10b is another schematic diagram of a collocated AP MLD set of an AP according to an embodiment of this application. As shown in FIG. 10b, it is assumed that the $AP_i$ is the AP 1x. Then, a set of APs collocated with the AP 1x includes: the AP 2y, an AP 3x, the AP 1y, the AP 2z, the AP 4y, the AP 2x, and the AP 4x. Therefore, the collocated AP MLD set of the AP 1x includes: the AP MLD 1, the AP MLD 2, and the AP MLD 3. Therefore, the AID that is carried in the AID allocation information and that is allocated to the non-AP MLD is different from the AID of the non-AP MLD associated with the AP MLD 1, is also different from the AID of the non-AP MLD associated with the AP MLD 2, and is also different from an AID of a non-AP MLD associated with the AP MLD 3. In other words, the AID of the non-AP MLD associated with the AP MLD 1, the AID of the non-AP MLD associated with the AP MLD 2, and the AID of the non-AP MLD associated with the AP MLD 3 need to be unique, in other words, need to be different from each other.

Figure 10C:
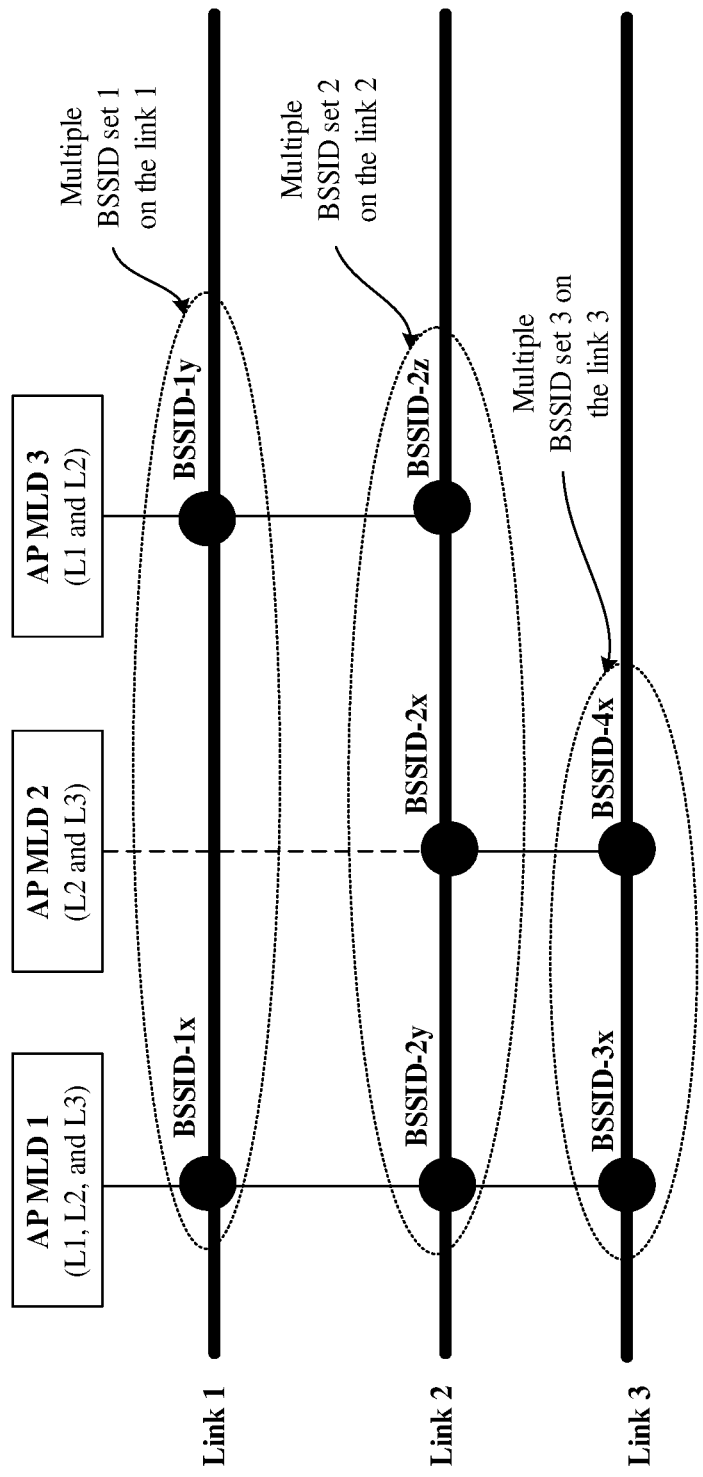
FIG. 10c is still another schematic diagram of a collocated AP MLD set of an AP according to an embodiment of this application.

FIG. 10c is still another schematic diagram of a collocated AP MLD set of an AP according to an embodiment of this application. As shown in FIG. 10c, it is assumed that the $AP_i$ is the AP 3x. Then, a set of APs collocated with the AP 3x includes: the AP 1x, the AP 2y, the AP 2x, the AP 4x, the AP 1y, and the AP 2z. Therefore, the collocated AP MLD set of the AP 3x includes: the AP MLD 1, the AP MLD 2, and the AP MLD 3. Therefore, the AID that is carried in the AID allocation information and that is allocated to the non-AP MLD is different from the AID of the non-AP MLD associated with the AP MLD 1, is also different from the AID of the non-AP MLD associated with the AP MLD 2, and is also different from an AID of a non-AP MLD associated with the AP MLD 3. In other words, the AID of the non-AP MLD associated with the AP MLD 1, the AID of the non-AP MLD associated with the AP MLD 2, and the AID of the non-AP MLD associated with the AP MLD 3 need to be unique, in other words, need to be different from each other.

FIG. 5 is still used as an example. It is assumed that the $AP_i$ is the AP 4x. Then, a set of APs collocated with the AP 4x includes: the AP 2x, the AP 4y, the AP 2z, the AP 1y, the AP 4z, the AP 5, the AP 1x, the AP 2y, and the AP 3. Therefore, the collocated AP MLD set of the AP 4x includes: the AP MLD 1, the AP MLD 2, the AP MLD 3, and an AP MLD 4. Therefore, the AID that is carried in the AID allocation information and that is allocated to the non-AP MLD is different from the AID of the non-AP MLD associated with the AP MLD 1, is also different from the AID of the non-AP MLD associated with the AP MLD 2, is also different from the AID of the non-AP MLD associated with the AP MLD 3, and is also different from an AID of a non-AP MLD associated with the AP MLD 4. In other words, the AID of the non-AP MLD associated with the AP MLD 1, the AID of the non-AP MLD associated with the AP MLD 2, the AID of the non-AP MLD associated with the AP MLD 3, and the AID of the non-AP MLD associated with the AP MLD 4 need to be unique, in other words, need to be different from each other.

Implementation B: The target AP MLD is any AP MLD in a set group in which the collocated AP MLD set of the $AP_i$ is located.

In the "set group in which the collocated AP MLD set of the $AP_i$ is located" mentioned in this embodiment of this application, some AP MLDs are collocated with the $AP_i$, and some other AP MLDs are collocated with other APs outside the collocated AP MLD set of the $AP_i$. In other words, the collocated AP MLD set of the $AP_i$ and a collocated AP MLD set of an AP other than the $AP_i$ in the collocated AP MLD set of the $AP_i$ constitute the set group. Herein, both the AP MLD and the target AP MLD belong to the set group in which the collocated AP MLD set of the $AP_i$ is located.

Specifically, the set group in which the collocated AP MLD set of the $AP_i$ is located is constituted by all APs in a collocated AP MLD set of any AP of an AP MLD collocated with the $AP_i$ (where the any AP may be understood as the $AP_i$ again). For example, as shown in FIG. 5, it is assumed that the $AP_i$ is the AP 1x. Then, the collocated AP MLD set of the AP 1x includes the AP MLD 1, the AP MLD 2, and the AP MLD 3. In addition, because the collocated AP MLD set of the AP 4x in the collocated AP MLD set of the AP 1x includes the AP MLD 2, the AP MLD 3, and the AP MLD 4, a set group in which the collocated AP MLD set of the AP 1x is located includes the AP MLD 1, the AP MLD 2, the AP MLD 3, and the AP MLD 4. Therefore, an AID allocated by the AP 1x to the non-AP MLD, the AID of the non-AP MLD associated with the AP MLD 1, the AID of the non-AP MLD associated with the AP MLD 2, the AID of the non-AP MLD associated with the AP MLD 3, and the AID of the non-AP MLD associated with the AP MLD 4 are different from each other.

As shown in FIG. 10a, it is assumed that the $AP_i$ is the AP 1x. Then, the collocated AP MLD set of the AP 1x includes the AP MLD 1 and the AP MLD 3. In addition, because a collocated AP MLD set of the AP 3y in the collocated AP MLD set of the AP 1x includes the AP MLD 2 and the AP MLD 3, the set group in which the collocated AP MLD set of the AP 1x is located includes the AP MLD 1, the AP MLD 2, and the AP MLD 3. Therefore, the AID allocated by the AP 1x to the non-AP MLD, the AID of the non-AP MLD associated with the AP MLD 1, the AID of the non-AP MLD associated with the AP MLD 2, and the AID of the non-AP MLD associated with the AP MLD 3 are different from each other.

As shown in FIG. 10b, it is assumed that the $AP_i$ is the AP 1x. Then, the collocated AP MLD set of the AP 1x includes the AP MLD 1, the AP MLD 2, and the AP MLD 3, and the set group in which the collocated AP MLD set of the AP 1x is located also includes the AP MLD 1, the AP MLD 2, and the AP MLD 3. Therefore, the AID allocated by the AP 1x to the non-AP MLD, the AID of the non-AP MLD associated with the AP MLD 1, the AID of the non-AP MLD associated with the AP MLD 2, and the AID of the non-AP MLD associated with the AP MLD 3 are different from each other.

As shown in FIG. 10c, it is assumed that the $AP_i$ is the AP 3x. Then, the collocated AP MLD set of the AP 3x includes the AP MLD 1, the AP MLD 2, and the AP MLD 3, and the set group in which the collocated AP MLD set of the AP 1x is located also includes the AP MLD 1, the AP MLD 2, and the AP MLD 3. Therefore, the AID allocated by the AP 1x to the non-AP MLD, the AID of the non-AP MLD associated with the AP MLD 1, the AID of the non-AP MLD associated with the AP MLD 2, and the AID of the non-AP MLD associated with the AP MLD 3 are different from each other.

Like Implementation A, in Implementation B, the AID allocated to the non-AP MLD is also different from an AID of a non-AP MLD associated with the AP MLD.

Optionally, for AID allocation to a single-link STA, an AID allocated by the $AP_i$ to the single-link STA on a current link (or an AID of the single-link STA associated with the $AP_i$) is different from the AID of the non-AP MLD associated with the target AP MLD, and the target AP MLD is any AP MLD in the collocated AP MLD set of the $AP_i$, or the target AP MLD is any AP MLD in the set group in which the collocated AP MLD set of the $AP_i$ is located.

For example, as shown in FIG. 10a, it is assumed that the $AP_i$ is the AP 1x and the AP 1x is on the link 1. Then, an AID of a single-link STA on the link 1 is different from the AID of the non-AP MLD associated with the AP MLD 1, and is also different from the AID of the non-AP MLD associated with the AP MLD 3. In other words, the AID of the single-link STA on the link 1, the AID of the non-AP MLD associated with the AP MLD 1, and the AID of the non-AP MLD associated with the AP MLD 3 need to be unique, in other words, need to be different from each other. It may be further understood that, in addition to the AID of the associated single-link STA on the link 1, an AID of an associated single-link STA on the link 2 may be the same as an AID of a non-AP MLD associated with the target AP MLD.

Alternatively, as shown in FIG. 10a, it is assumed that the $AP_i$ is the AP 1x and the AP 1x is on the link 1. Then, an AID of a single-link STA on the link 1 is different from each of the AID of the non-AP MLD associated with the AP MLD 1, the AID of the non-AP MLD associated with the AP MLD 2, and the AID of the non-AP MLD associated with the AP MLD 3.

It may be understood that, in a wireless communications system, an identifier of an AP MLD is 0 by default, and multiple APs of the AP MLD share the identifier (namely, the identifier 0). However, the multiple APs of the AP MLD may alternatively have different identifiers.

It may be further understood that cross-link TIM indication can be performed under the same AP MLD, to be specific, if the AP 1 and the AP 2 belong to a same AP MLD, the AP 1 can add TIM information of the AP 2 to a TIM indication, to indicate whether the AP 2 has a traffic for the non-AP MLD associated with the AP 2. Therefore, AIDs of multiple non-AP MLDs associated with the same AP MLD are different from each other.

Therefore, if a same identifier system is used, such as a range [1, 2007], identifiers of multiple APs of the AP MLD need to be unique, in other words, need to be different from each other; AIDs of multiple non-AP MLDs associated with the same AP MLD also need to be unique, in other words, need to be different from each other. In this embodiment of this application, an "AID allocated to a non-AP MLD" is a value selected from remaining space, and also needs to be unique. The remaining space herein refers to a set of remaining values in the range [1, 2007] other than values that have been used and that are not allowed to be reused.

Figures 11, 12:
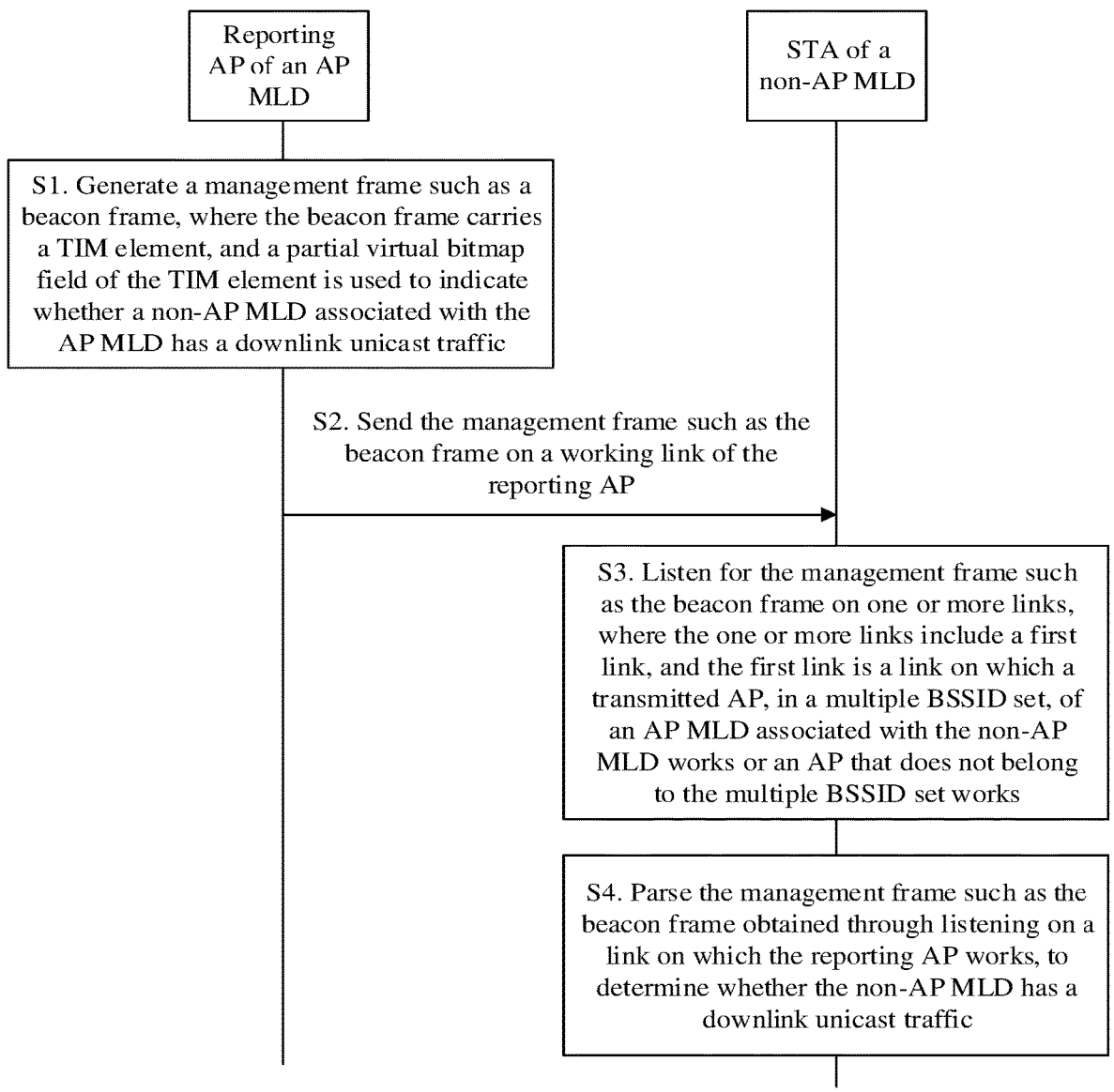
FIG. 11 is a schematic diagram of a frame format of an AID element according to an embodiment of this application.
FIG. 12 is another schematic flowchart of an individually addressed traffic indication method applicable to multiple links according to an embodiment of this application.

Optionally, the AID allocation information may be carried in an association response (association response) frame, or may be carried in other frames. Specifically, an AID allocated to the non-AP MLD in the AID allocation information may be carried in an AID element of the association response frame. FIG. 11 is a schematic diagram of a frame format of an AID element according to an embodiment of this application. As shown in FIG. 11, the AID element includes a 1-byte element identifier field, a 1-byte length field, and a 2-byte AID field.

Optionally, the association response frame may alternatively carry information such as a link identifier of each AP. The association response frame is used to acknowledge that a multi-link association is established with the non-AP MLD.

S203: The STA of the non-AP MLD parses the received association response frame, to obtain an AID carried in the association response frame.

Optionally, before step S201, the method further includes the following steps: S204: The STA of the non-AP MLD generates an association request (association request) frame. S205: The STA of the non-AP MLD sends the association request frame to the $AP_i$ of the AP MLD, where the association request frame is used to request to establish a multi-link association with the AP MLD. Correspondingly, the $AP_i$ of the AP MLD receives the association request frame. The association request frame may carry a link identifier of each STA of the non-AP MLD and information about each STA.

Optionally, after receiving the association request frame, the $AP_i$ of the AP MLD may send an acknowledgment frame to the STA of the non-AP MLD, where the acknowledgment frame is used to acknowledge that the $AP_i$ of the AP MLD has received the association request frame.

In this embodiment of this application, when an AID is allocated to a non-AP MLD, the solution described in Embodiment 1 is considered: an AP MLD helps another AP MLD indicate whether a non-AP MLD associated with the another AP MLD has a downlink individually addressed traffic. Therefore, the AID is not the AID of the non-AP MLD associated with the target AP MLD. The target AP MLD is any AP MLD in the collocated AP MLD set of the $AP_i$, or the target AP MLD is any AP MLD in the set group in which the collocated AP MLD set of the $AP_i$ is located, so that an AID ambiguity is avoided when it is indicated whether the non-AP MLD has a downlink individually addressed traffic.

Embodiment 3

In Embodiment 3 of this application, a problem that some APs of an AP MLD cannot indicate whether a non-AP MLD associated with the AP MLD has a downlink individually addressed traffic is resolved by limiting a link on which the non-AP MLD listens for a downlink individually addressed traffic indication. In addition, in this case, an AP of another AP MLD working on the same link as the foregoing some APs do not help the foregoing some APs send downlink individually addressed traffic indications. For example, in FIG. 5, if the AP 1x is the reporting AP, it is assumed that the non-AP MLD 1 is associated with the AP 2y and the AP 3 of the AP MLD 1. If the non-AP MLD 1 listens only on the link 2 for a downlink individually addressed traffic indication, the AP 2y (a non-transmitted AP in a multiple BSSID set) of the AP MLD 1 cannot send a downlink individually addressed traffic indication, and in addition, a transmitted AP in the same multiple BSSID set on the same link does not help send a downlink individually addressed traffic indication of the MLD in which the AP 2y is located. In this case, the non-AP MLD 1 listening on the link 2 cannot receive a downlink individually addressed traffic indication, in other words, the non-AP MLD 1 cannot determine whether the non-AP MLD 1 has a downlink individually addressed traffic.

Therefore, Embodiment 3 of this application provides an individually addressed traffic indication method applicable to multiple links. FIG. 12 is another schematic flowchart of an individually addressed traffic indication method applicable to multiple links according to an embodiment of this application. As shown in FIG. 12, the method includes the following steps.

S1: A reporting AP of an AP MLD generates a management frame such as a beacon frame, where the beacon frame carries a TIM element, and a partial virtual bitmap field of the TIM element is used to indicate whether a non-AP MLD associated with the AP MLD has a downlink individually addressed traffic.

S2: The reporting AP of the AP MLD sends the management frame such as the beacon frame on a working link of the reporting AP.

For a specific frame format of the TIM element, refer to FIG. 2. For a frame format of a partial virtual bitmap field, refer to FIG. 7. Details are not described herein again.

S3: A STA of the non-AP MLD listens for the management frame such as the beacon frame on one or more links, where the one or more links include a first link, and the first link is a link on which a transmitted AP, in a multiple BSSID set, of an AP MLD associated with the non-AP MLD works or an AP that does not belong to the multiple BSSID set works.

S4: The STA of the non-AP MLD parses the management frame such as the beacon frame obtained through listening on a link on which the reporting AP works, to determine whether the non-AP MLD has a downlink individually addressed traffic.

Specifically, for step S3, in other words, the STA of the non-AP MLD cannot listen for the beacon frame only on a link on which a non-transmitted AP in the multiple BSSID set is located. The STA of the non-AP MLD may listen for the beacon frame or another management frame on a link on which a transmitted AP included in the multiple BSSID set or an AP that does not belong to the multiple BSSID set is located. For example, in FIG. 5, if the AP 1x is the reporting AP, it is assumed that the non-AP MLD 1 is associated with the AP 1x, the AP 2y, and the AP 3 of the AP MLD 1. If the AP 1x sends a beacon frame on the link 1, the non-AP MLD 1 listens for a beacon frame on the link 1, or on the link 1 and the link 2, or on the link 1 and the link 3, or on the link 3. The non-AP MLD 1 cannot listen for a beacon frame only on the link 2.

Optionally, links on which a non-AP MLD listens cannot include only a link on which a non-transmitted AP of an associated AP MLD works. For example, as shown in FIG. 5, the links on which the non-AP MLD listens may include the link 1 and the link 2, or the link 1 and the link 3, or the link 2 and the link 3, or the link 1, the link 2, and the link 3; but not only the link 2.

It can be learned that in this embodiment of this application, a link on which the non-AP MLD listens for a downlink individually addressed traffic indication is limited, so that the non-AP MLD listens on a link (denoted as a first link for ease of description) on which a transmitted AP, in a multiple BSSID set, of an AP MLD associated with the non-AP MLD works or an AP that does not belong to the multiple BSSID set works. In addition, because the transmitted AP of the AP MLD and the AP that does not belong to the multiple BSSID set can send a beacon frame (the beacon frame carries a downlink individually addressed traffic indication), the non-AP MLD may obtain a beacon frame through listening on the first link, so that it can be determined, by parsing the beacon frame, whether the non-AP MLD has a downlink individually addressed traffic.

The foregoing content describes in detail the methods provided in this application. To better implement the foregoing solutions in embodiments of this application, embodiments of this application further provide corresponding apparatuses or devices.

In embodiments of this application, the multi-link device may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used. The following describes in detail communications apparatuses in embodiments of this application with reference to FIG. 13 to FIG. 17. The communications apparatus is an access point in an access point multi-link device or a station in a station multi-link device. Further, the communications apparatus may be an apparatus in an AP MLD, or an apparatus in a STA MLD.

Figure 13:
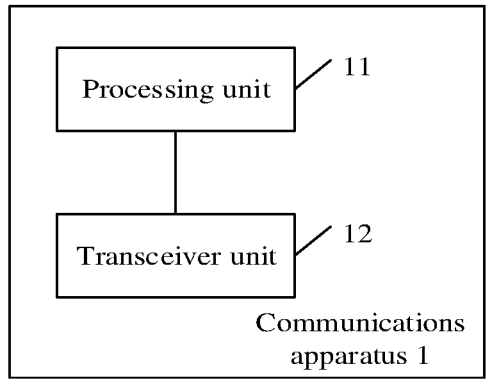
FIG. 13 is a schematic diagram of a structure of a communications apparatus 1 according to an embodiment of this application.

When an integrated unit is used, FIG. 13 is a schematic diagram of a structure of a communications apparatus 1 according to an embodiment of this application. As shown in FIG. 13, the communications apparatus 1 includes a processing unit 11 and a transceiver unit 12.

The communications apparatus 1 may be a first AP MLD or a chip in the first AP MLD, for example, a Wi-Fi chip, or may be a first AP of the first AP MLD. The first AP is a reporting AP, and belongs to the first AP MLD.

In a design, the processing unit 11 is configured to generate individually addressed traffic indication information. The transceiver unit 12 is configured to send the individually addressed traffic indication information on a first link, where the first link is a working link of the first AP. The individually addressed traffic indication information is used to indicate whether a non-AP MLD associated with the first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which the first AP is located belongs.

It can be learned that in the communications apparatus 1, the individually addressed traffic indication information generated by the processing unit 11 cannot only indicate whether the non-AP MLD associated with the first AP MLD has a downlink individually addressed traffic, but also help the second AP MLD indicate whether the non-AP MLD associated with the second AP MLD has a downlink individually addressed traffic, and the second AP MLD is an AP MLD to which a non-transmitted AP in a multiple BSSID set in which the first AP is located belongs. This can resolve a problem that some APs or all APs of AP MLDs cannot indicate whether non-AP MLDs associated with the AP MLDs have downlink individually addressed traffics, so that the non-AP MLDs associated with the APs can normally receive downlink individually addressed traffics.

Optionally, the processing unit 11 is further configured to generate AID allocation information, where the AID allocation information carries an AID allocated to the non-AP MLD, and the AID is different from the AID of the non-AP MLD associated with the second AP MLD; and the transceiver unit 12 is further configured to send the AID allocation information. The AID allocation information is carried in an association response frame. It may be understood that the AID allocation information may be alternatively carried in other frames.

Optionally, the transceiver unit 12 is further configured to receive an association request frame, where the association request frame is used to request to establish a multi-link association with the communications apparatus 1.

It should be understood that the communications apparatus 1 in this design may correspondingly perform Embodiment 1, and the foregoing operations or functions of each unit in the communications apparatus 1 are separately used to implement corresponding operations of the first AP of the first AP MLD in Embodiment 1. For brevity, details are not described herein again.

Optionally, the communications apparatus 1 may be an AP MLD or a chip in the AP MLD, for example, a Wi-Fi chip, or may be a reporting AP of the AP MLD.

In another design, the processing unit 11 is configured to generate a management frame such as a beacon frame, where the beacon frame carries a TIM element, and a partial virtual bitmap field of the TIM element is used to indicate whether a non-AP MLD associated with the AP MLD has a downlink individually addressed traffic. The transceiver unit 12 is configured to send the management frame such as the beacon frame on a working link of the transceiver unit 12.

It should be understood that the communications apparatus 1 in this design may correspondingly perform Embodiment 3, and the foregoing operations or functions of each unit in the communications apparatus 1 are separately used to implement corresponding operations of the reporting AP of the AP MLD in Embodiment 3. For brevity, details are not described herein again.

Figure 14:
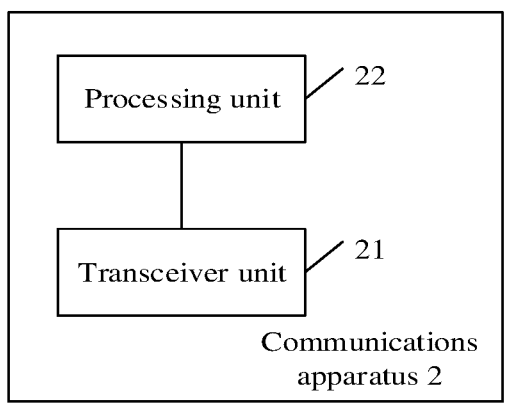
FIG. 14 is a schematic diagram of a structure of a communications apparatus 2 according to an embodiment of this application.

FIG. 14 is a schematic diagram of a structure of a communications apparatus 2 according to an embodiment of this application. As shown in FIG. 14, the communications apparatus 2 includes a transceiver unit 21 and a processing unit 22.

The communications apparatus 2 may be a non-AP MLD or a chip in the non-AP MLD, for example, a Wi-Fi chip, or may be a first STA in the non-AP MLD.

In a design, the transceiver unit 21 is configured to receive individually addressed traffic indication information on a first link on which the communications apparatus 2 works. The processing unit 22 is configured to determine, according to the received individually addressed traffic indication information, whether the non-AP MLD on which the communications apparatus 2 is located has a downlink individually addressed traffic. The individually addressed traffic indication information is used to indicate whether a non-AP MLD associated with a first AP MLD has a downlink individually addressed traffic and whether a non-AP MLD associated with a second AP MLD has a downlink individually addressed traffic, and the second AP MLD is an AP MLD to which a non-transmitted AP in a multiple BSSID set in which the first AP is located belongs.

It can be learned that in the communications apparatus 2, the processing unit 22 may learn, according to the individually addressed traffic indication information, whether the processing unit 22 has a downlink individually addressed traffic, to ensure that the processing unit 22 can receive the downlink individually addressed traffic.

Optionally, the transceiver unit 21 may be further configured to receive AID allocation information. The processing unit 22 may be further configured to parse the received AID allocation information, to learn that the AID allocation information carries an AID allocated to the non-AP MLD. The AID is different from an AID of a non-AP MLD associated with a target AP MLD, and the target AP MLD is any AP MLD in a collocated AP MLD set of the first AP. The AID allocation information is carried in an association response frame. It may be understood that the AID allocation information may be alternatively carried in other frames.

Optionally, the processing unit 22 is further configured to generate an association request frame. The transceiver unit 21 is further configured to send the association request frame to a second AP of the first AP MLD. The association request frame is used to request to establish a multi-link association with the first AP MLD.

It should be understood that the communications apparatus 2 in this design may correspondingly perform Embodiment 1, and the foregoing operations or functions of each unit in the communications apparatus 2 are separately used to implement corresponding operations of the first STA of the non-AP MLD in Embodiment 1. For brevity, details are not described herein again.

Optionally, the communications apparatus 2 may be a non-AP MLD or a chip in the non-AP MLD, for example, a Wi-Fi chip, or may be any STA in the non-AP MLD.

In another design, the transceiver unit 21 is configured to listen for a management frame such as a beacon frame on one or more links, where the one or more links include a first link, and the first link is a link on which a transmitted AP, in a multiple BSSID set, of an AP MLD associated with the non-AP MLD works or an AP that does not belong to the multiple BSSID set works. The processing unit 22 is configured to parse the management frame such as the beacon frame obtained through listening on a link on which a reporting AP works, to determine whether the non-AP MLD has a downlink individually addressed traffic.

It should be understood that the communications apparatus 2 in this design may correspondingly perform Embodiment 3, and the foregoing operations or functions of each unit in the communications apparatus 2 are separately used to implement corresponding operations of the STA of the non-AP MLD in Embodiment 3. For brevity, details are not described herein again.

Figure 15:
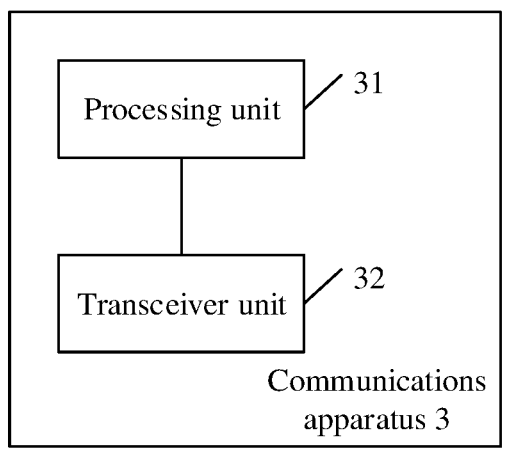
FIG. 15 is a schematic diagram of a structure of a communications apparatus 3 according to an embodiment of this application.

FIG. 15 is a schematic diagram of a structure of a communications apparatus 3 according to an embodiment of this application. The communications apparatus 3 may be an AP MLD or a chip in the AP MLD, for example, a Wi-Fi chip. Optionally, the communications apparatus 3 corresponds to the AP MLD described in Embodiment 2 or any AP of the AP MLD. As shown in FIG. 15, the communications apparatus 3 includes a processing unit 31 and a transceiver unit 32.

The processing unit 31 is configured to generate AID allocation information, where the AID allocation information carries an AID allocated to a non-AP MLD, the AID is different from an AID of a non-AP MLD associated with a target AP MLD, and the target AP MLD is any AP MLD in a collocated AP MLD set of an APi, or the target AP MLD is any AP MLD in a set group in which the collocated AP MLD set of the APi is located. The transceiver unit 32 is configured to send the AID allocation information. The APi is any AP of an AP MLD.

Optionally, if the target AP MLD is any AP MLD in a collocated AP MLD set of the APi, both the AP MLD and the target AP MLD belong to the collocated AP MLD set of the APi.

Optionally, the AID allocation information is carried in an association response frame. It may be understood that the AID allocation information may be alternatively carried in other frames.

Optionally, the transceiver unit 32 is further configured to receive an association request frame, where the association request frame is used to request to establish a multi-link association with the AP MLD.

It can be learned that in the communications apparatus 3, the AID that is allocated to the non-AP MLD and that is carried in the AID allocation information generated by the processing unit 31 is different from an AID of a non-AP MLD associated with a target AP MLD. The target AP MLD herein is any AP MLD in the collocated AP MLD set of the APi, or the target AP MLD is any AP MLD in a set group of collocated AP MLD sets of the APi. In this way, an AID ambiguity can be avoided when it is indicated whether the non-AP MLD has a downlink individually addressed traffic.

It should be understood that the communications apparatus 3 described in this embodiment of this application may correspondingly perform Embodiment 2, and the foregoing operations or functions of each unit in the communications apparatus 3 are separately used to implement corresponding operations of the APi of the AP MLD in Embodiment 2. For brevity, details are not described herein again.

Figure 16:
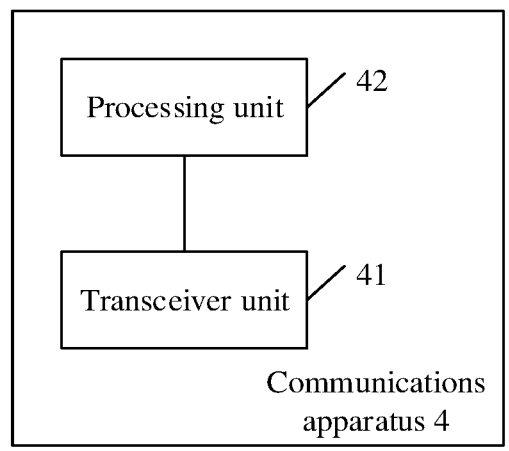
FIG. 16 is a schematic diagram of a structure of a communications apparatus 4 according to an embodiment of this application.

FIG. 16 is a schematic diagram of a structure of a communications apparatus 4 according to an embodiment of this application. The communications apparatus 4 may be a non-AP MLD or a chip in the non-AP MLD, for example, a Wi-Fi chip. Optionally, the communications apparatus 4 corresponds to the non-AP MLD described in Embodiment 2 or any STA of the non-AP MLD. As shown in FIG. 16, the communications apparatus 4 includes a transceiver unit 41 and a processing unit 42.

The transceiver unit 41 is configured to receive AID allocation information from an access point of an AP MLD. The processing unit 42 is configured to parse the received AID allocation information to obtain an AID that is allocated to a non-AP MLD and that is carried in the AID allocation information, where the AID is different from an AID of a non-AP MLD associated with a target AP MLD, and the target AP MLD is any AP MLD in a collocated AP MLD set of an APi, or the target AP MLD is any AP MLD in a set group in which the collocated AP MLD set of the APi is located. The APi is any AP of an AP MLD.

Optionally, if the target AP MLD is any AP MLD in a collocated AP MLD set of the APi, both the AP MLD and the target AP MLD belong to the collocated AP MLD set of the APi.

Optionally, the AID allocation information is carried in an association response frame. It may be understood that the AID allocation information may be alternatively carried in other frames.

Optionally, the processing unit 42 is further configured to generate an association request frame. The transceiver unit 41 is further configured to send the association request frame, where the association request frame is used to request to establish a multi-link association with the AP MLD.

It should be understood that the communications apparatus 4 described in this embodiment of this application may correspondingly perform Embodiment 2, and the foregoing operations or functions of each unit in the communications apparatus 4 are separately used to implement corresponding operations of the STA of the non-AP MLD in Embodiment 2. For brevity, details are not described herein again.

The foregoing describes the AP MLD and the non-AP MLD in embodiments of this application. The following describes possible product forms of the AP MLD and the non-AP MLD. It should be understood that any product in any form that has functions of the AP MLD in FIG. 13 or FIG. 15 and any product in any form that has functions of the non-AP MLD in FIG. 14 or FIG. 16 fall within the protection scope of embodiments of this application. It should be further understood that the following descriptions are merely examples, and product forms of the AP MLD and the non-AP MLD in embodiments of this application are not limited thereto.

In a possible product form, the AP MLD and the non-AP MLD in embodiments of this application may be implemented by using a general bus architecture.

Figure 17:
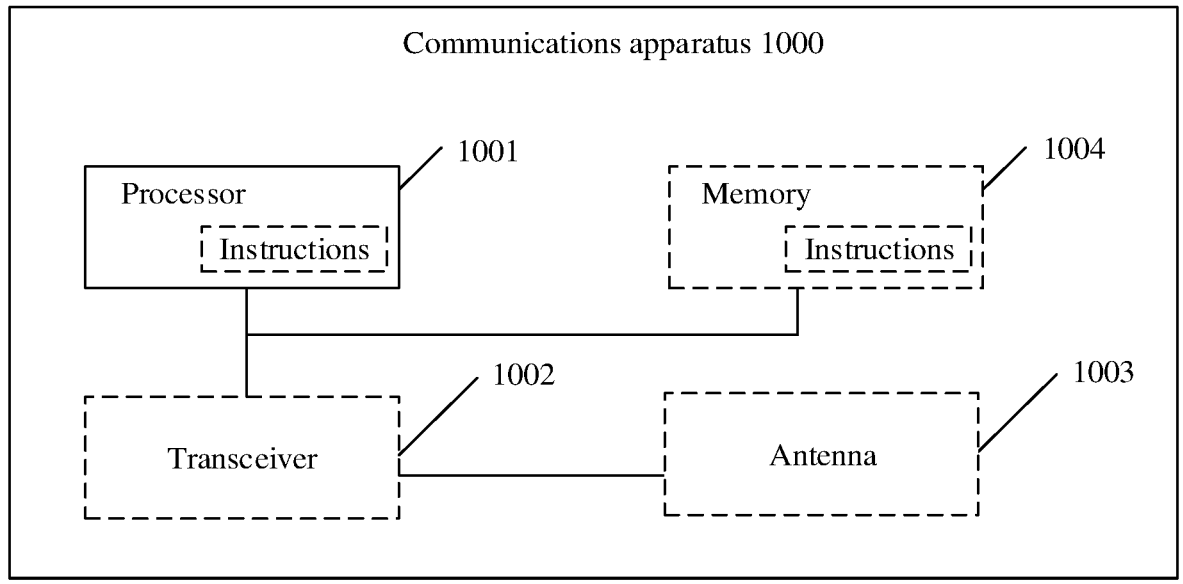
FIG. 17 is a schematic diagram of a structure of a communications apparatus 1000 according to an embodiment of this application.

FIG. 17 is a schematic diagram of a structure of a communications apparatus 1000 according to an embodiment of this application. The communications apparatus 1000 may be an AP MLD, a non-AP MLD, or an apparatus in the AP MLD or the non-AP MLD. As shown in FIG. 17, the communications apparatus 1000 includes a processor 1001 and a transceiver 1002 that is internally connected to and communicates with the processor. The processor 1001 is a general-purpose processor, a dedicated processor, or the like. For example, the processor 1001 may be a baseband processor or a central processing unit. The baseband processor may be configured to process a communications protocol and communication data, and the central processing unit may be configured to control a communications apparatus (for example, a base station, a baseband chip, a terminal, a terminal chip, a DU, or a CU) to execute a computer program, to process data of the computer program. The transceiver 1002 may be referred to as a transceiver unit, a transceiver, a transceiver circuit, or the like, and is configured to implement a transceiver function. The transceiver 1002 may include a receiver and a transmitter. The receiver may be referred to as a receiver machine, a receiver circuit, or the like, and is configured to implement a receiving function. The transmitter may be referred to as a transmitter machine, a transmitter circuit, or the like, and is configured to implement a sending function. Optionally, the communications apparatus 1000 may further include an antenna 1003.

Optionally, the communications apparatus 1000 may include one or more memories 1004. The memory 1004 may store instructions. The instructions may be a computer program. The computer program may be run on the communications apparatus 1000, to enable the communications apparatus 1000 to perform the methods described in the foregoing method embodiments. Optionally, the memory 1004 may further store data. The communications apparatus 1000 and the memory 1004 may be separately disposed, or may be integrated together.

The processor 1001, the transceiver 1002, and the memory 1004 may be connected through a communications bus.

In a design, the communications apparatus 1000 may be configured to perform functions of the first AP of the first AP MLD in the foregoing Embodiment 1. The processor 1001 may be configured to perform step S101 in FIG. 6 and/or another process of the technology described in this specification. The transceiver 1002 may be configured to perform step S102 in FIG. 6 and/or another process of the technology described in this specification.

In a design, the communications apparatus 1000 may be configured to perform functions of the first STA of the non-AP MLD in the foregoing Embodiment 1. The processor 1001 may be configured to perform step S104 in FIG. 6 and/or another process of the technology described in this specification. The transceiver 1002 may be configured to perform step S103 in FIG. 6 and/or another process of the technology described in this specification.

In a design, the communications apparatus 1000 may be configured to perform functions of the AP of the AP MLD in the foregoing Embodiment 2. The processor 1001 may be configured to perform step S201 in FIG. 9 and/or another process of the technology described in this specification. The transceiver 1002 may be configured to perform step S202 in FIG. 9 and/or another process of the technology described in this specification.

In a design, the communications apparatus 1000 may be configured to perform functions of the STA of the non-AP MLD in the foregoing Embodiment 2. The processor 1001 may be configured to perform steps S203 and S204 in FIG. 9 and/or another process of the technology described in this specification. The transceiver 1002 may be configured to perform step S205 in FIG. 9 and/or another process of the technology described in this specification.

In a design, the communications apparatus 1000 may be configured to perform functions of the reporting AP of the AP MLD in the foregoing Embodiment 3. The processor 1001 may be configured to perform step S1 in FIG. 12 and/or another process of the technology described in this specification. The transceiver 1002 may be configured to perform step S2 in FIG. 12 and/or another process of the technology described in this specification.

In a design, the communications apparatus 1000 may be configured to perform functions of the STA of the non-AP MLD in the foregoing Embodiment 3. The processor 1001 may be configured to perform step S4 in FIG. 12 and/or another process of the technology described in this specification. The transceiver 1002 may be configured to perform step S3 in FIG. 12 and/or another process of the technology described in this specification.

In any one of the foregoing designs, the processor 1001 may include a transceiver configured to implement receiving and sending functions. For example, the transceiver may be a transceiver circuit, an interface, or an interface circuit. The transceiver circuit, the interface, or the interface circuit configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In any one of the foregoing designs, the processor 1001 may store instructions. The instructions may be a computer program. The computer program is run on the processor 1001, to enable the communications apparatus 1000 to perform the methods described in the foregoing method embodiments. The computer program may be fixed in the processor 1001. In this case, the processor 1001 may be implemented by hardware.

In an implementation, the communications apparatus 1000 may include a circuit, and the circuit may implement a sending, receiving, or communication function in the foregoing method embodiments. The processor and the transceiver described in this application may be implemented in an integrated circuit (integrated circuit, IC), an analog IC, a radio frequency integrated circuit RFIC, a mixed-signal IC, an application-specific integrated circuit (application-specific integrated circuit, ASIC), a printed circuit board (printed circuit board, PCB), an electronic device, or the like. The processor and the transceiver may be manufactured by using various IC technologies, for example, a complementary metal oxide semiconductor (complementary metal oxide semiconductor, CMOS), an N-type metal oxide semiconductor (nMetal-oxide-semiconductor, NMOS), a P-type channel metal oxide semiconductor (positive channel metal oxide semiconductor, PMOS), a bipolar junction transistor (bipolar junction transistor, BJT), a bipolar CMOS (BiCMOS), silicon germanium (SiGe), and gallium arsenide (GaAs).

A scope of the communications apparatus described in this application is not limited thereto, and a structure of the communications apparatus may not be limited by FIG. 17. The communications apparatus may be an independent device or may be a part of a large device. For example, the communications apparatus may be:

(1) an independent integrated circuit IC, a chip, or a chip system or subsystem;
(2) a set including one or more ICs, where optionally, the IC set may further include a storage component configured to store data and a computer program;
(3) an ASIC, for example, a modem (Modem);
(4) a module that can be embedded in another device;
(5) a receiver, a terminal, an intelligent terminal, a cellular phone, a wireless device, a handheld device, a mobile unit, a vehicle-mounted device, a network device, a cloud device, an artificial intelligence device, or the like; or
(6) another device or the like.

In a possible product form, the AP MLD and the non-AP MLD in embodiments of this application may be implemented by a general-purpose processor.

A general-purpose processor that implements the AP MLD includes a processing circuit and an input/output interface that is internally connected to and communicates with the processing circuit. In a design, the general-purpose processor may be configured to perform functions of the first AP of the first AP MLD in the foregoing Embodiment 1. Specifically, the processing circuit is configured to perform step S101 in FIG. 6 and/or another process of the technology described in this specification. The input/output interface is configured to perform step S102 in FIG. 6 and/or another process of the technology described in this specification.

In another design, the general-purpose processor may be configured to perform functions of the AP of the AP MLD in the foregoing Embodiment 2. Specifically, the processing circuit is configured to perform step S201 in FIG. 9 and/or another process of the technology described in this specification. The input/output interface is configured to perform step S202 in FIG. 9 and/or another process of the technology described in this specification.

In still another design, the general-purpose processor may be configured to perform functions of the reporting AP of the AP MLD in the foregoing Embodiment 3. Specifically, the processing circuit is configured to perform step S1 in FIG. 12 and/or another process of the technology described in this specification. The input/output interface is configured to perform step S2 in FIG. 12 and/or another process of the technology described in this specification.

A general-purpose processor that implements the non-AP MLD includes a processing circuit and an input/output interface that is internally connected to and communicates with the processing circuit. In a design, the general-purpose processor may be configured to perform functions of the first STA of the non-AP MLD in the foregoing Embodiment 1. Specifically, the processing circuit is configured to perform step S104 in FIG. 6 and/or another process of the technology described in this specification. The input/output interface is configured to perform step S103 in FIG. 6 and/or another process of the technology described in this specification.

In another design, the general-purpose processor may be configured to perform functions of the STA of the non-AP MLD in the foregoing Embodiment 2. Specifically, the processing circuit is configured to perform steps S203 and S204 in FIG. 9 and/or another process of the technology described in this specification. The input/output interface is configured to perform step S205 in FIG. 9 and/or another process of the technology described in this specification.

In still another design, the general-purpose processor may be configured to perform functions of the STA of the non-AP MLD in the foregoing Embodiment 3. Specifically, the processing circuit is configured to perform step S4 in FIG. 12 and/or another process of the technology described in this specification. The input/output interface is configured to perform step S3 in FIG. 12 and/or another process of the technology described in this specification.

In a possible product form, the AP MLD and the non-AP MLD in embodiments of this application may alternatively be implemented by using the following: one or more FPGAs (field programmable gate arrays), a PLD (programmable logic device), a controller, a state machine, gate logic, a discrete hardware component, any other suitable circuit, or any combination of circuits that can perform various functions described in this application.

It should be understood that the communications apparatuses in the foregoing various product forms have any function of the AP MLD or the non-AP MLD in the foregoing method embodiments. Details are not described herein again.

An embodiment of this application further provides a computer-readable storage medium. The computer-readable storage medium stores computer program code. When the processor executes the computer program code, an electronic device performs the method in any one of the foregoing embodiments.

An embodiment of this application further provides a computer program product. When the computer program product runs on a computer, the computer is enabled to perform the method in any one of the foregoing embodiments.

An embodiment of this application further provides a communications apparatus. The apparatus may exist in a product form of a chip. A structure of the apparatus includes a processor and an interface circuit. The processor is configured to communicate with another apparatus by using a receiver circuit, to enable the apparatus to perform the method in any one of the foregoing embodiments.

An embodiment of this application further provides a wireless communications system, including an AP MLD and a non-AP MLD. The AP MLD and the non-AP MLD may perform the method in any one of the foregoing embodiments.

Method or algorithm steps described in combination with the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

What is claimed is:

1. A method applicable to multiple links, comprising:
generating, by a first access point (AP) of a first access point multi-link device (AP MLD), individually addressed traffic indication information, wherein the individually addressed traffic indication information indicates whether a first non-access-point multi-link device (non-AP MLD) associated with the first AP MLD has a downlink individually addressed traffic and whether a second non-AP MLD associated with a second AP MLD has a downlink individually addressed traffic, and the second AP MLD is an AP MLD to which a non-transmitted AP belongs, and the non-transmitted AP is in a multiple basic service set identifier (BSSID) set in which the first AP is located; and
sending, by the first AP of the first AP MLD, the individually addressed traffic indication information on a first link, wherein the first link is a working link of the first AP.

2. The method according to claim 1, wherein one bit of the individually addressed traffic indication information corresponds to one association identifier (AID), and the bit of the individually addressed traffic indication information indicates whether a non-AP MLD identified by a corresponding AID has a downlink individually addressed traffic.

3. The method according to claim 1, wherein association identifiers (AIDs) corresponding to bits of the individually addressed traffic indication information are different from each other.

4. The method according to claim 1, wherein the individually addressed traffic indication information is carried in a partial virtual bitmap field of a traffic indication map (TIM) element.

5. The method according to claim 1, wherein the individually addressed traffic indication information is located in a beacon frame or a TIM frame.

6. The method according to claim 5, wherein the beacon frame comprises special fields, and one of the special fields corresponds to one non-AP MLD that has a downlink individually addressed traffic, and indicates one or more links on which the non-AP MLD receives the downlink individually addressed traffic.

7. The method according to claim 1, wherein an AID space used by the first AP MLD to allocate an AID to the first non-AP MLD associated with the first AP MLD and a second AID space used by the second AP MLD to allocate an AID to the second non-AP MLD associated with the second AP MLD are the same.

8. The method according to claim 1, wherein the method further comprises:
generating, by the first AP of the first AP MLD, association identifier (AID) allocation information, wherein the AID allocation information carries an AID allocated to a respective non-AP MLD, and the AID is different from another AID of another non-AP MLD; and
sending, by the first AP of the first AP MLD, the AID allocation information.

9. A communications apparatus comprising:
a transceiver;
at least one processor; and
at least one memory coupled to the at least one processor and storing programming instructions for execution by the at least one processor and causing the communications apparatus to:
generate individually addressed traffic indication information, wherein the individually addressed traffic indication information indicates whether a first non-AP MLD associated with a first AP MLD has a downlink individually addressed traffic and whether a second non-AP MLD associated with a second AP MLD has a downlink individually addressed traffic, and the second AP MLD is an AP MLD to which a non-transmitted AP belongs, and the non-transmitted AP is in a multiple BSSID set in which a first AP is located; and
send the individually addressed traffic indication information on a first link, wherein the first link is a working link of the first AP.

10. The communications apparatus according to claim 9, wherein one bit of the individually addressed traffic indication information corresponds to one association identifier (AID), and the bit of the individually addressed traffic indication information indicates whether a non-AP MLD identified by a corresponding AID has a downlink individually addressed traffic.

11. The communications apparatus according to claim 9, wherein association identifiers (AIDs) corresponding to bits of the individually addressed traffic indication information are different from each other.

12. The communications apparatus according to claim 9, wherein the individually addressed traffic indication information is carried in a partial virtual bitmap field of a traffic indication map (TIM) element.

13. The communications apparatus according to claim 9, wherein the individually addressed traffic indication information is located in a beacon frame or a TIM frame.

14. The communications apparatus according to claim 13, wherein the beacon frame comprises special fields, and one of the special fields corresponds to one non-AP MLD that has a downlink individually addressed traffic, and indicates one or more links on which the non-AP MLD receives the downlink individually addressed traffic.

15. The communications apparatus according to claim 9, wherein an AID space used by the first AP MLD to allocate an AID to the first non-AP MLD associated with the first AP MLD and an AID space used by the second AP MLD to allocate an AID to the second non-AP MLD associated with the second AP MLD are the same.

16. The communications apparatus according to claim 9, wherein the programming instructions are for execution by the at least one processor and cause the communications apparatus to:
generate association identifier (AID) allocation information, wherein the AID allocation information carries an AID allocated to a respective non-AP MLD, and the AID is different from another AID of another non-AP MLD; and
send the AID allocation information.

17. A first access point multi-link device (AP MLD), wherein the first AP MLD includes a first AP and a second AP, the first AP comprising:
a transceiver;
at least one processor; and
at least one memory coupled to the at least one processor and storing programming instructions for execution by the at least one processor and causing the first AP to:
generate individually addressed traffic indication information, wherein the individually addressed traffic indication information is used to indicates whether a first non-AP MLD associated with the first AP MLD has a downlink individually addressed traffic and whether a second non-AP MLD associated with a second AP MLD has a downlink individually addressed traffic, and the second AP MLD is an AP MLD to which a non-transmitted AP belongs, and the non-transmitted AP is in a multiple basic service set identifier (BSSID) set in which a first AP is located; and
send the individually addressed traffic indication information on a first link, wherein the first link is a working link of the first AP.

18. The first AP MLD according to claim 17, wherein association identifiers (AIDs) corresponding to bits of the individually addressed traffic indication information are different from each other.

19. The first AP MLD according to claim 17, wherein the individually addressed traffic indication information is located in a beacon frame or a TIM frame, wherein the beacon frame comprises special fields, and one of the special fields corresponds to one non-AP MLD that has a downlink individually addressed traffic, and is used to indicate one or more links on which the non-AP MLD receives the downlink individually addressed traffic.

20. The first AP MLD according to claim 17, wherein an AID space used by the first AP MLD to allocate an AID to the first non-AP MLD associated with the first AP MLD and an AID space used by the second AP MLD to allocate an AID to the second non-AP MLD associated with the second AP MLD are the same.

* * * * *